(12) United States Patent
Hosseini et al.

(10) Patent No.: US 12,464,463 B2
(45) Date of Patent: *Nov. 4, 2025

(54) POWER SAVING TECHNIQUES FOR SIDELINK COMMUNICATION

(71) Applicant: QUALCOMM Incorporated, San Diego, CA (US)

(72) Inventors: Seyedkianoush Hosseini, San Diego, CA (US); Peter Pui Lok Ang, San Diego, CA (US); Gabi Sarkis, San Diego, CA (US); Wooseok Nam, San Diego, CA (US); Gokul Sridharan, Sunnyvale, CA (US); Tingfang Ji, San Diego, CA (US); Zhibin Wu, Los Altos, CA (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,767

(22) Filed: Jun. 6, 2023

(65) Prior Publication Data

US 2024/0155495 A1 May 9, 2024

Related U.S. Application Data

(63) Continuation of application No. 16/996,601, filed on Aug. 18, 2020, now Pat. No. 11,671,917.

(Continued)

(51) Int. Cl.
*H04W 52/02* (2009.01)
*H04B 7/0413* (2017.01)
*H04W 72/23* (2023.01)

(52) U.S. Cl.
CPC ...... *H04W 52/0235* (2013.01); *H04B 7/0413* (2013.01); *H04W 72/23* (2023.01)

(58) Field of Classification Search
CPC . H04W 52/0235; H04W 72/23; H04W 72/54; H04W 72/08; H04W 76/19;
(Continued)

(56) References Cited

U.S. PATENT DOCUMENTS 10,306,660 B2 5/2019 Gupta et al.
2015/0382324 A1 12/2015 Sheng et al.
(Continued)

FOREIGN PATENT DOCUMENTS

CA 3038086 C * 7/2020 ........... H04L 5/0053
CN 102340754 A 2/2012
(Continued)

OTHER PUBLICATIONS

J. Puttonen and F. Chernogorov, "The Effect of Discontinuous Reception and RRC Release Timer Parameterization on Mobility," 2014 IEEE 79th Vehicular Technology Conference (VTC Spring), Seoul, Korea (South), 2014, pp. 1-5, doi: 10.1109/VTCSpring.2014. 7023119. (Year: 2014).*

(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. A user equipment (UE) may identify a set of one or more sidelink resources, and the UE may identify wake-up signal occasions associated with the resources. The UE may monitor for wake-up signals during the wake-up signal occasions, and the UE may further monitor the associated set of one or more resources based on receiving a wake-up signal. In some examples, respective sets of one (Continued)

or more sidelink resources may be associated with a number of multiple-input multiple-output layers used for sidelink communications, or may indicate respective bandwidth parts used for monitoring sidelink transmissions.

12 Claims, 19 Drawing Sheets

Related U.S. Application Data

(60) Provisional application No. 62/888,951, filed on Aug. 19, 2019.

(58) Field of Classification Search
CPC . H04W 52/0229; H04W 68/02; H04W 24/08; H04B 7/0413; H04L 1/0058; H04L 43/026
See application file for complete search history.

(56) References Cited

U.S. PATENT DOCUMENTS

| | | | |
|---|---|---|---|
| 2016/0143002 A1 | 5/2016 | Lindoff et al. | |
| 2016/0366645 A1* | 12/2016 | Song | H04W 52/0229 |
| 2017/0325167 A1 | 11/2017 | Lu et al. | |
| 2018/0049193 A1 | 2/2018 | Belleschi et al. | |
| 2019/0090299 A1 | 3/2019 | Ang et al. | |
| 2020/0228283 A1 | 7/2020 | Cai et al. | |
| 2020/0245395 A1* | 7/2020 | Zhang | H04W 76/19 |
| 2020/0305127 A1 | 9/2020 | Huang et al. | |
| 2020/0344722 A1 | 10/2020 | He et al. | |
| 2021/0037468 A1* | 2/2021 | Huang | H04W 72/044 |
| 2021/0050954 A1 | 2/2021 | Ryu et al. | |
| 2021/0051587 A1* | 2/2021 | Wu | H04W 68/02 |
| 2021/0058866 A1 | 2/2021 | Hosseini et al. | |
| 2021/0176751 A1 | 6/2021 | Belleschi et al. | |
| 2021/0243796 A1 | 8/2021 | Panteleev et al. | |
| 2021/0259044 A1 | 8/2021 | Islam et al. | |
| 2021/0392658 A1* | 12/2021 | Thangarasa | H04W 72/54 |
| 2022/0038943 A1* | 2/2022 | Hu | H04W 24/08 |
| 2022/0182206 A1 | 6/2022 | Zhao | |
| 2024/0276596 A1* | 8/2024 | Zhang | H04W 76/19 |

FOREIGN PATENT DOCUMENTS

| | | | | |
|---|---|---|---|---|
| EP | 3228129 A1 | 10/2017 | | |
| WO | WO-2015100971 A1 | 7/2015 | | |
| WO | WO-2016166664 A1 * | 10/2016 | | H04W 72/54 |
| WO | 2017165205 | 9/2017 | | |
| WO | 2017196611 A1 | 11/2017 | | |
| WO | WO-2018064477 A1 * | 4/2018 | | H04W 76/28 |
| WO | WO-2018175760 A1 | 9/2018 | | |
| WO | 2018199652 A1 | 11/2018 | | |
| WO | WO-2019125748 A1 | 6/2019 | | |
| WO | WO-2021034079 A1 | 2/2021 | | |

OTHER PUBLICATIONS

International Preliminary Report on Patentability—PCT/US2020/047010, The International Bureau of WIPO—Geneva, Switzerland, Mar. 3, 2022.
International Search Report and Written Opinion—PCT/US2020/047010—ISA/EPO—Nov. 4, 2020.
European Search Report—EP24190289—Search Authority—Munich—Dec. 19, 2024.

* cited by examiner

POWER SAVING TECHNIQUES FOR SIDELINK COMMUNICATION

CROSS REFERENCE

The present application for patent is a continuation of U.S. patent application Ser. No. 16/996,601, filed Aug. 18, 2020, which claims the benefit of U.S. Provisional Patent Application No. 62/888,951, filed Aug. 19, 2019, assigned to the assignee hereof, and expressly incorporated by reference in its entirety.

INTRODUCTION

The following relates to wireless communications and more specifically to techniques enabling power saving at a device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a first UE is described. The method may include identifying a set of one or more resources for sidelink communication with a second UE over a sidelink communication link and transmitting, to the second UE, a wake-up signal (WUS) over the sidelink communication link. In some examples, the WUS may be transmitted during a WUS occasion that is associated with the set of one or more resources. The method may also include transmitting, based on the WUS, a message to the second UE using the set of one or more resources.

An apparatus for wireless communication is described. The apparatus may include a processor and memory coupled to the processor. The processor and memory may be configured to identify (e.g., at a first UE) a set of one or more resources for sidelink communication with a second UE over a sidelink communication link, and transmit, to the second UE, a WUS over the sidelink communication link. In some examples, the WUS may be transmitted during a WUS occasion that is associated with the set of one or more resources. The processor and memory may be configured to transmit, based on the WUS, a message to the second UE using the set of one or more resources.

Another apparatus for wireless communication is described. The apparatus may include means for identifying (e.g., at a first UE) a set of one or more resources for sidelink communication with a second UE over a sidelink communication link and transmitting, to the second UE, a WUS over the sidelink communication link. In some examples, the WUS may be transmitted during a WUS occasion that is associated with the set of one or more resources. In some examples, the apparatus may include means for transmitting, based on the WUS, a message to the second UE using the set of one or more resources.

A non-transitory computer-readable medium storing code for wireless communication at a first UE is described. The code may include instructions executable by a processor to identify a set of one or more resources for sidelink communication with a second UE over a sidelink communication link, and transmit, to the second UE, a WUS over the sidelink communication link. In some examples, the WUS may be transmitted during a WUS occasion that is associated with the set of one or more resources. The code may include instructions executable by a processor to transmit, based on the WUS, a message to the second UE using the set of one or more resources.

In some examples of the method, apparatuses, and non-transitory computer-readable medium described herein, identifying the set of one or more resources may include operations, features, means, or instructions for receiving, from a base station, a resource grant indicating the set of one or more resources for the sidelink communication, where the WUS associated with the set of one or more resources may be transmitted based on the resource grant.

In some examples of the method, apparatuses, and non-transitory computer-readable medium described herein, the set of one or more resources may be associated with a number of multiple input multiple output (MIMO) layers.

In some examples of the method, apparatuses, and non-transitory computer-readable medium described herein, identifying the set of one or more resources may include operations, features, means, or instructions for selecting the set of one or more resources from a plurality of sets of resources for the sidelink communication, each set of the plurality of sets of resources being associated with respective WUS occasions, where the WUS associated with the set of one or more resources may be transmitted based on the selected set of one or more resources.

Some examples of the method, apparatuses, and non-transitory computer-readable medium described herein may further include operations, features, means, or instructions for determining a number of MIMO layers for communicating with the second UE over the sidelink communication link, where the set of one or more resources may be selected based on the determined number of MIMO layers.

Some examples of the method, apparatuses, and non-transitory computer-readable medium described herein may further include operations, features, means, or instructions for identifying one or more groups of slots for transmitting the message, and transmitting the message during at least one of the one or more groups of slots, where the WUS indicates the one or more groups of slots to the second UE.

In some examples of the method, apparatuses, and non-transitory computer-readable medium described herein, the one or more groups of slots may be indicated to the second UE via a bitmap or a sequence.

Some examples of the method, apparatuses, and non-transitory computer-readable medium described herein may further include operations, features, means, or instructions for transmitting the WUS in a first bandwidth part (BWP) of the sidelink communication link, where transmitting the message includes transmitting the message in a second BWP that is different from the first BWP.

In some examples of the method, apparatuses, and non-transitory computer-readable medium described herein, the second BWP may be from a set of bandwidth parts (BWPs) associated with the sidelink communication.

In some examples of the method, apparatuses, and non-transitory computer-readable medium described herein, transmitting the message may include operations, features, means, or instructions for transmitting the message during one or more sidelink control channel periods, each sidelink control channel period including a physical sidelink control channel and a physical sidelink shared channel.

In some examples of the method, apparatuses, and non-transitory computer-readable medium described herein, each sidelink control channel period may have a duration of a slot.

A method of wireless communication at a first UE is described. The method may include identifying a set of one or more resources for sidelink communication with a second UE over a sidelink communication link and receiving, from the second UE, a WUS over the sidelink communication link. In some examples, the WUS may be received based on monitoring a WUS occasion that is associated with the set of one or more resources. The method may further include monitoring the identified set of one or more resources for a transmission from the second UE based on the received WUS.

An apparatus for wireless communication is described. The apparatus may include a processor and memory coupled to the processor. The processor and memory may be configured to identify (e.g., at a first UE) a set of one or more resources for sidelink communication with a second UE over a sidelink communication link and receive, from the second UE, a WUS over the sidelink communication link. In some examples, the WUS may be received based on monitoring a WUS occasion that is associated with the set of one or more resources. The processor and memory may be configured to monitor the identified set of one or more resources for a transmission from the second UE based on the received WUS.

Another apparatus for wireless communication at a first UE is described. The apparatus may include means for identifying a set of one or more resources for sidelink communication with a second UE over a sidelink communication link and receiving, from the second UE, a WUS over the sidelink communication link. In some examples, the WUS may be received based on monitoring a WUS occasion that is associated with the set of one or more resources. The apparatus may also include means for monitoring the identified set of one or more resources for a transmission from the second UE based on the received WUS.

A non-transitory computer-readable medium storing code for wireless communication at a first UE is described. The code may include instructions executable by a processor to identify a set of one or more resources for sidelink communication with a second UE over a sidelink communication link and receive, from the second UE, a WUS over the sidelink communication link. In some examples, the WUS received based on monitoring a WUS occasion that is associated with the set of one or more resources. The instructions executable by a processor to monitor the identified set of one or more resources for a transmission from the second UE based on the received WUS.

In some examples of the method, apparatuses, and non-transitory computer-readable medium described herein, identifying the set of one or more resources may include operations, features, means, or instructions for identifying the set of one or more resources based on the received WUS.

Some examples of the method, apparatuses, and non-transitory computer-readable medium described herein may further include operations, features, means, or instructions for identifying a bitmap that indicates the set of one or more resources based on the WUS.

Some examples of the method, apparatuses, and non-transitory computer-readable medium described herein may further include operations, features, means, or instructions for identifying one or more groups of slots based on an indication associated with the received WUS, where monitoring the identified set of one or more resources for the transmission from the second UE may be performed during each of the one or more groups of slots.

Some examples of the method, apparatuses, and non-transitory computer-readable medium described herein may further include operations, features, means, or instructions for refraining from monitoring one or more groups of time periods based on the indication, the one or more groups of time periods including symbol periods, or slots, or a combination thereof.

In some examples of the method, apparatuses, and non-transitory computer-readable medium described herein, the indication includes a bitmap associated with the WUS.

In some examples of the method, apparatuses, and non-transitory computer-readable medium described herein, the set of one or more resources may be from a plurality of sets of resources for the sidelink communication, each set of the plurality of sets of resources being associated with respective WUS occasions.

In some examples of the method, apparatuses, and non-transitory computer-readable medium described herein, each set of the plurality of sets of resources may be associated with a respective number of MIMO layers.

Some examples of the method, apparatuses, and non-transitory computer-readable medium described herein may further include operations, features, means, or instructions for monitoring for the WUS in a first BWP of the sidelink communication link, where monitoring the set of one or more resources for the transmission includes monitoring a second BWP that is different from the first BWP.

In some examples of the method, apparatuses, and non-transitory computer-readable medium described herein, the second BWP may be from a set of BWPs associated with the sidelink communication.

In some examples of the method, apparatuses, and non-transitory computer-readable medium described herein, monitoring the set of one or more resources for the transmission may include operations, features, means, or instructions for monitoring the set of one or more resources during one or more sidelink control channel periods, each sidelink control channel period including a physical sidelink control channel and a physical sidelink shared channel.

In some examples of the method, apparatuses, and non-transitory computer-readable medium described herein, each sidelink control channel period may have a duration of a slot.

In some examples of the method, apparatuses, and non-transitory computer-readable medium described herein, the physical sidelink control channel and the physical sidelink shared channel may be non-overlapping in time, or non-overlapping in frequency, or overlapping in time, or overlapping in frequency, or any combination thereof.

A method of wireless communication at a base station is described. The method may include identifying a set of one or more resources for sidelink communication between a first UE and second UE over a sidelink communication link, where the set of one or more resources are associated with one or more WUS occasions. The method may also include transmitting, to the first UE, a resource grant scheduling the set of one or more resources on the sidelink communication link.

An apparatus for wireless communication is described. The apparatus may include a processor and memory coupled to the processor. The processor and memory may be configured to identify (e.g., at a base station) a set of one or more resources for sidelink communication between a first UE and second UE over a sidelink communication link, where the set of one or more resources are associated with one or more WUS occasions. The processor and memory may also be configured to transmit, to the first UE, a resource grant scheduling the set of one or more resources on the sidelink communication link.

Another apparatus for wireless communication at a base station is described. The apparatus may include means for identifying a set of one or more resources for sidelink communication between a first UE and second UE over a sidelink communication link, where the set of one or more resources are associated with one or more WUS occasions. The apparatus may include means for transmitting, to the first UE, a resource grant scheduling the set of one or more resources on the sidelink communication link.

A non-transitory computer-readable medium storing code for wireless communication at a base station is described. The code may include instructions executable by a processor to identify a set of one or more resources for sidelink communication between a first UE and second UE over a sidelink communication link, where the set of one or more resources are associated with one or more WUS occasions. In some examples, the instructions may be executable by the processor to transmit, to the first UE, a resource grant scheduling the set of one or more resources on the sidelink communication link.

In some examples of the method, apparatuses, and non-transitory computer-readable medium described herein, identifying the set of one or more resources may include operations, features, means, or instructions for selecting the set of one or more resources from a plurality of sets of resources for the sidelink communication, each set of the plurality of sets of resources being associated with respective WUS occasions.

In some examples of the method, apparatuses, and non-transitory computer-readable medium described herein, identifying the set of one or more resources may include operations, features, means, or instructions for determining a number of MIMO layers for the sidelink communication, where the set of one or more resources may be selected based on the determined number of MIMO layers.

In some examples of the method, apparatuses, and non-transitory computer-readable medium described herein, the set of one or more resources includes one or more sidelink control channel periods, each sidelink control channel period including a physical sidelink control channel and a physical sidelink shared channel.

In some examples of the method, apparatuses, and non-transitory computer-readable medium described herein, each sidelink control channel period may have a duration of a slot.

DETAILED DESCRIPTION

Figure 1:
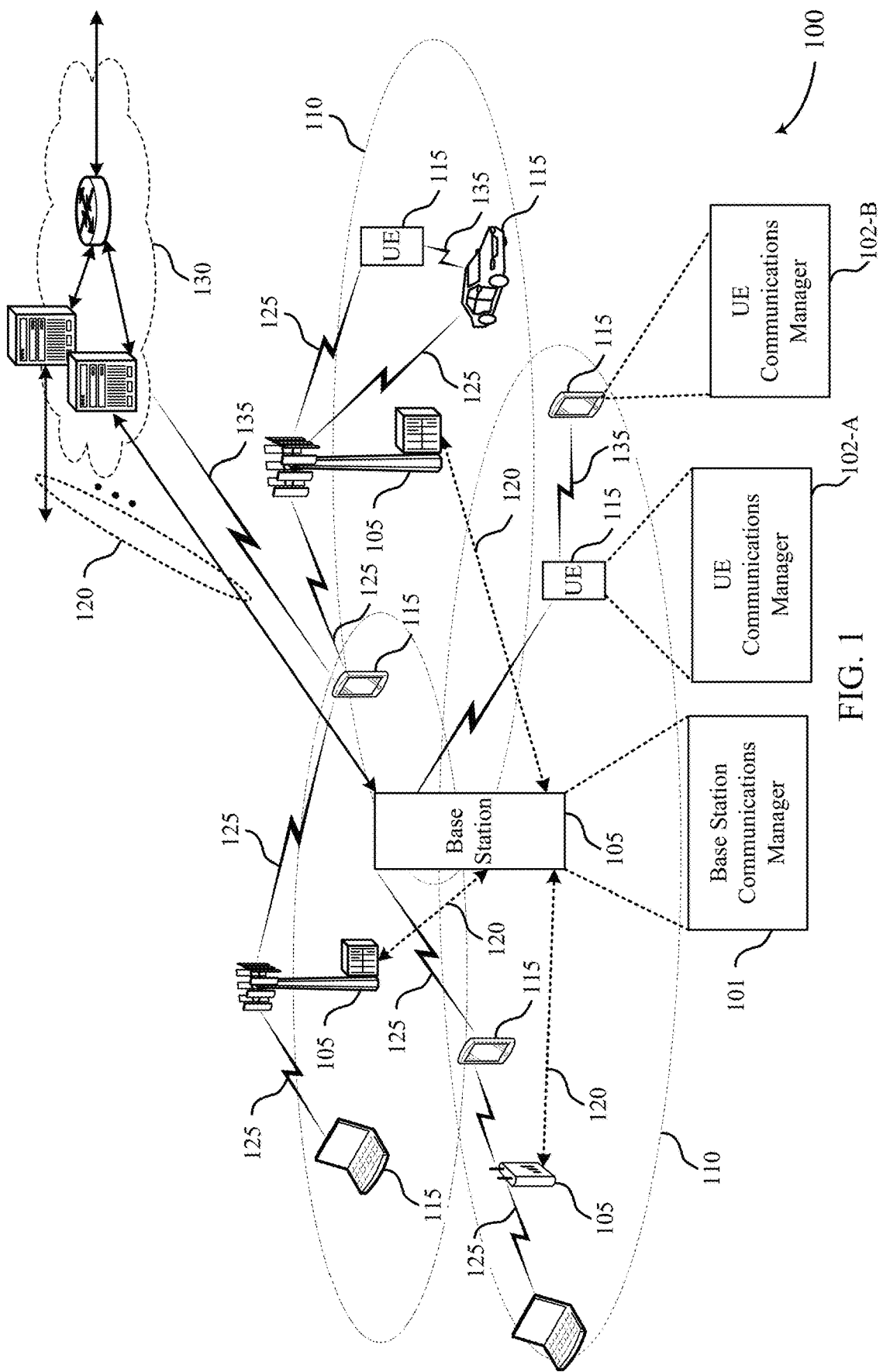
FIG. 1 illustrates an example of a system for wireless communications that supports power saving techniques for sidelink communication in accordance with one or more aspects of the present disclosure.

A wireless communications system may support both access links and sidelinks for communications between wireless devices. An access link may refer to a communication link between a user equipment (UE) and a base station. For example, an access link may support uplink signaling, downlink signaling, connection establishment and synchronization procedures, etc. A sidelink may refer to communication links between similar wireless devices (e.g., a communication link between UEs or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs.

Sidelink communications may be utilized by UEs in various states of coverage within a cell. For example, sidelink communications may include communications between two UEs that are both within a coverage area provided by a base station, between one UE in coverage and another UE outside of coverage (e.g., an out-of-coverage UE), or between two UEs that are both outside of coverage. As these examples illustrate, there may be cases in which a UE may communicate over a sidelink while outside the coverage of a base station, and the UE may therefore lack a direct connection with the network (e.g., via a radio resource control (RRC) link). As a result, an out-of-coverage UE may irregularly monitor for paging signals from the network and may also be unaware of one or more other UEs that may be transmitting information to the out-of-coverage UE via the sidelink communication link. The out-of-coverage UE may thus monitor sidelink resource pools for sidelink transmissions from other UEs. Likewise, UEs that are in-coverage may also be unaware of when sidelink transmissions may be sent, and the in-coverage UEs may accordingly monitor sidelink resource pools for transmissions from another UE. In some cases, such monitoring for sidelink transmission by UEs may be continuous to ensure sidelink transmissions are not missed, and the UEs may consume excess power as a result.

However, as described herein, power saving techniques for sidelink communications may be used to enable reduced power consumption and extended battery life. For example, power savings techniques may be implemented for a UE through the use of wake-up signals (WUSs) for sidelink communication. In such cases, sets of resources (e.g., resource pools) may be selected for communications between UEs on a sidelink, where respective resource pools may be associated with different WUS occasions. For instance, a first set of one or more sidelink resource pools (e.g., including uplink and downlink resource pools) may be associated with a first WUS occasion (e.g., having a certain offset from a beginning of one or more physical sidelink control channel (PSCCH) periods), whereas a second set of one or more sidelink resource pools may be associated with a second WUS occasion (e.g., having a different offset from a beginning of one or more PSCCH periods). In such cases, the WUS occasions may be indicated by the sidelink resource pools used or, alternatively, a WUS may indicate (e.g., via a bitmap or a WUS sequence) which sidelink resource pools may be used for sidelink communications. In either case, a UE may monitor the sidelink resources for transmissions from another UE on the sidelink based on receiving an associated WUS. In some examples, the WUS may be UE-specific (e.g., the WUS may be designated to wake up a specific UE, or the WUS may be targeted to wake up a specific group of UEs).

Further, different sets of resource pools may be associated with a respective number of MIMO layers. Thus, sidelink resources may be selected based on a number of MIMO layers appropriate for a sidelink transmission, providing further granularity for UEs to save power through the use of dynamically selected resources and associated MIMO layers for sidelink communications. As such, a corresponding WUS may be used to modify the number of MIMO layers by indicating which resource pools may be monitored by the UE. Additionally or alternatively, different sidelink BWPs may be activated through the use of the sidelink WUS s, where a WUS may be transmitted on a first BWP that activates a second, different BWP (e.g., a larger BWP, one or more other BWPs designated for sidelink communications, or the like). In some examples, a sidelink WUS may be separate or may depend from a WUS used for a direct link or a Uu link. In such cases where the WUS is independent from the Uu link, the sidelink WUS is may change or modify parameters for sidelink communications, and a different Uu WUS may change or modify the parameters for Uu communications. In some other cases, if a sidelink WUS and a Uu WUS are dependent, then a command for one may modify the parameters for the other (e.g., a command associated with a sidelink WUS may modify parameters for a Uu WUS, or a command for a Uu WUS may modify parameters for a sidelink WUS). Through one or any combination of the described techniques, UEs may implement various schemes for power savings enhancements, thereby improving battery life and reducing unnecessary power consumption at the UE when communicating on a sidelink.

Aspects of the disclosure are initially described in the context of wireless communications systems. Further examples of WUSs associated with resource pools are then described with reference to wireless communications systems. Aspects of the disclosure are further illustrated by and described with reference to apparatus diagrams, system diagrams, and flowcharts that relate to power saving techniques for sidelink communication.

FIG. 1 illustrates an example of a wireless communications system 100 that supports power saving techniques for sidelink communication in accordance with one or more aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology. In some examples, a UE 115 may communicate with the core network 130 through communication link 135.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a BWP) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link (e.g., a sidelink communication link 135) may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

Some of the network devices, such as a base station 105, may include subcomponents such as an access network entity, which may be an example of an access node controller (ANC). Each access network entity may communicate with UEs 115 through a number of other access network transmission entities, which may be referred to as radio heads, smart radio heads, or transmission/reception points (TRPs). Each access network transmission entity may include one or more antenna panels. In some configurations, various functions of each access network entity or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, MIMO communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may monitor a communication link 125 (e.g., a wireless link) 115 continuously for an indication that the UE 115 may receive data. In other cases (e.g., to conserve power and extend battery life) a UE 115 may be configured with a discontinuous reception (DRX) cycle. A DRX cycle consists of an "On Duration" when the UE 115 may monitor for control information (e.g., on a physical downlink control channel (PDCCH)) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the ON Duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

Wireless communications system 100 may support various techniques for power savings when communicating on a sidelink. As an example, a UE 115 may determine one or more sidelink DRX parameters for use when communicating with another UE 115 over a sidelink communication link. The sidelink DRX parameters may be indicated to the UE 115 by a base station 105 or by another UE 115 (e.g., an in-coverage UE 115). In some examples, a UE 115 may select the sidelink DRX parameters from a set of sidelink DRX parameters, and the UE 115 may indicate the selected parameters to another UE 115 (e.g., an out-of-coverage UE 115). Based on the sidelink DRX parameters received, a UE 115 may discontinuously monitor for transmissions from another UE 115 over the sidelink communication link. As such, the UE 115 may refrain from continuously monitoring for sidelink transmissions in accordance with the sidelink DRX parameters (e.g., an ON duration, various sidelink DRX timers, and other DRX parameters) and may thereby save power and reduce battery consumption at the UE 115.

Wireless communications system 100 may support the use of WUSs for power saving when communicating on a sidelink communication link 135. As an example, a UE 115 may identify a set of one or more resources (e.g., including uplink and downlink time/frequency resources) for sidelink communications. Additionally, the UE 115 may identify WUS occasions that are associated with the set of one or more resources. In some cases, the set of one or more resources may indicate the WUS occasions to be used. Additionally or alternatively, a WUS may indicate which set of one or more resources may be used for sidelink communications. In either case, a UE 115 may receive a WUS and monitor associated resources for a transmission from another UE 115 on the sidelink communication link 135. In some cases, the WUS may indicate some time periods (e.g., grouped symbols and/or slots) during which the sidelink transmission may be sent. Thus, when monitoring for the sidelink transmission on the sidelink resource(s), the UE 115 may monitor the indicated time periods, and the UE 115 may, in some examples, refrain from monitoring time periods (e.g., other grouped time periods) when the sidelink transmission is not expected, enabling further power saving at the UE 115.

In some cases, the set of one or more sidelink resources may also be associated with a number of MIMO layers, where different sidelink resources may each be associated with different numbers of MIMO layers. In some cases, a base station 105 may schedule the set of one or more sidelink resources based on a number of MIMO layers to be used for sidelink transmissions, where the resources scheduled correspond to the number of MIMO layers. Additionally or alternatively, a UE 115 may select resources associated with an appropriate number of MIMO layers for sidelink communications. As such, a corresponding WUS may be used to modify the number of MIMO layers by indicating which resources may be monitored by a UE 115. In some cases, a BWP including the WUS (e.g., a default BWP) may be smaller than a size of the BWP used for the set of one or more sidelink resources. As such, a UE 115 may monitor the default BWP for the WUS and, if received, the WUS may activate another, larger BWP for monitoring for a sidelink transmission from another UE 115. The other BWP may also be a configured BWP (e.g., one or more sidelink BWPs may be configured), and the WUS may accordingly indicate which resources correspond to the activated BWP. Thus, by using varying BWPs associated with sets of sidelink resources, a BWP may be adjusted to the traffic communicated over the sidelink communication link 135, thereby providing further power saving at the UE 115 (e.g., the UE 115 avoids monitoring larger BWPs than needed).

One or more of the base stations 105 may include a base station communications manager 101, which may identify a set of one or more resources (e.g., resource pools) for sidelink communication between a first UE 115 and second UE 115 over a sidelink communication link 135, where the set of one or more resources are associated with one or more WUS occasions and transmit, to the first UE 115, a resource grant scheduling the set of one or more resources on the sidelink communication link 135. The base station communications manager 101 may be an example of aspects of the base station communications manager 1510 described herein.

UEs 115 may include a UE communications manager 102-*a*, which may identify a set of one or more resources (e.g., resource pools) for sidelink communication with a second UE 115 and a second UE communications manager 102-*b* over a sidelink communication link 135, transmit, to the second UE 115, a WUS over the sidelink communication link 135, the WUS transmitted during a WUS occasion that is associated with the set of one or more resources, and transmit, based on the WUS, a message to the second UE 115 using the set of one or more resources. The UE communications manager 102-*a* may also identify a set of one or more resources for sidelink communication with a second UE 115 and the UE communications manager 102-*b* over a sidelink communication link 135, receive, from the second UE, a WUS over the sidelink communication link 135, the WUS received based on monitoring a WUS occasion that is associated with the set of one or more resources, and monitor the identified set of one or more resources for a transmission from the second UE 115 based on the received WUS. The UE communications managers 102-*a* and 102-*b* may be an example of aspects of the UE communications manager 1110 described herein.

Figure 2A:
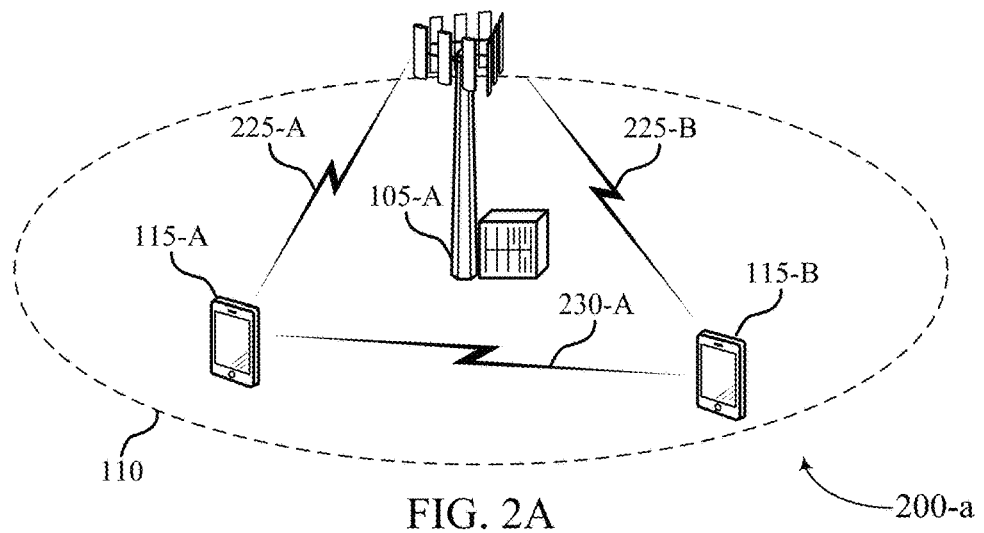
FIGS. 2A, 2B, and 2C illustrate examples of wireless communications systems that support power saving techniques for sidelink communication in accordance with one or more aspects of the present disclosure.
Figure 2B:
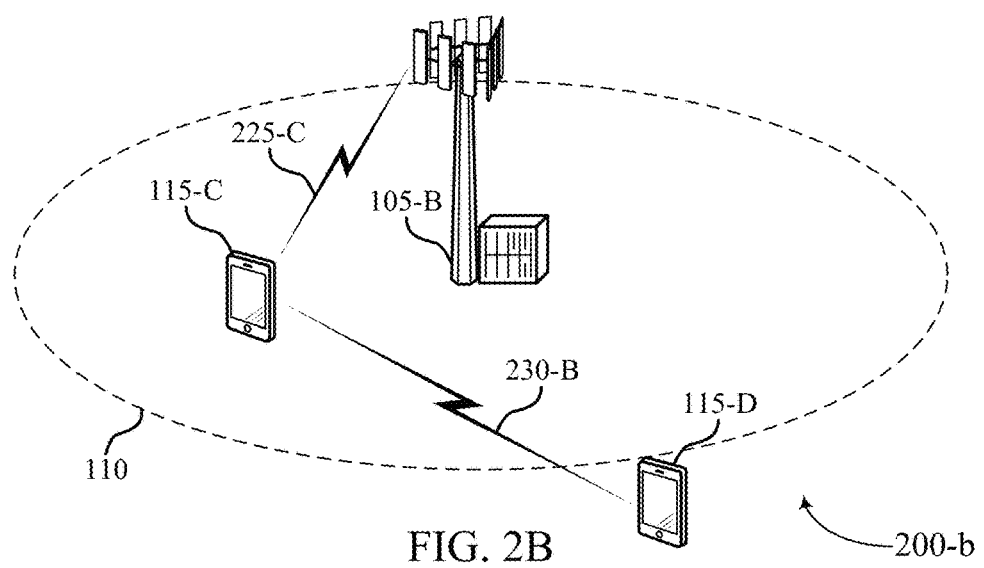
Figure 2C:
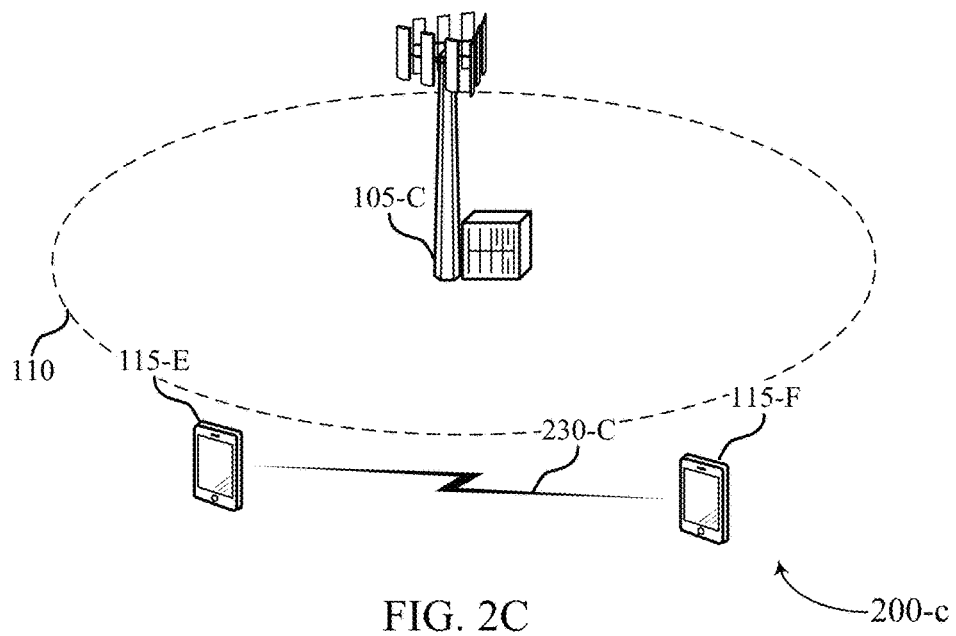

FIGS. 2A, 2B, and 2C illustrate examples of wireless communications systems 200-*a*, 200-*b*, and 200-*c* that support power saving techniques for sidelink communication in accordance with one or more aspects of the present disclosure. In some examples, wireless communications systems 200-*a*, 200-*b*, and 200-*c* may implement aspects of wireless communications system 100. For example, wireless communications systems 200-*a*, 200-*b*, and 200-*c* each include a base station 105 (e.g., base station 105-*a*, base station 105-*b*, and base station 105-*c*) and one or more UEs 115 (e.g., UEs 115-*a* through UE 115-*f*), which may be examples of the corresponding devices described with reference to FIG. 1. Wireless communications systems 200-*a*, 200-*b*, and 200-*c* may illustrate various levels of coverage for UEs 115 that communicate using sidelink communications.

In some cases, a UE 115-*a* may communicate directly with another UE 115-*b* (or with another group of UEs 115) over a sidelink connection (e.g., using a peer-to-peer (P2P) or device-to-device (D2D) protocol). Such communications may be referred to as D2D or sidelink communications, where a first UE 115 may be scheduled (e.g., by a base station 105 or another UE 115) to transmit data or control information to a second UE 115 over a sidelink. In some cases, a sidelink may be a communication link or a signal transmitted between different UEs 115 in a network, where one UE 115 may act as a relay for information transmitted by another device.

In the example of the wireless communications system 200-*a*, one or more of a group of UEs 115 (e.g., UE 115-*a* and UE 115-*b*) may support sidelink communications in addition to direct communication with a base station 105-*a* within the coverage area 110 of base station 105-*a*. In such cases, the UEs 115-*a* and 115-*b* may be in-coverage. For example, UE 115-*a* may communicate with the base station 105-*a* via communication link 225-*a*, while maintaining sidelink communications over sidelink 230-*a* with the UE 115-*b*. In addition, UE 115-*b* may communicate with the base station over communication link 225-*b* while also communicating with UE 115-*a* using the sidelink 230-*a*. In some in-coverage cases, each UE 115 may be connected to the base station 105 via a direct link (e.g., via a Uu interface).

In the example of wireless communications system 200-*b*, one or more of a group of UEs 115 (e.g., UE 115-*c* and 115-*d*) may support sidelink communication techniques. In the example of FIG. 2B, UE 115-*c* may be within the coverage area 110 of the base station 105-*b*, and UE 115-*c* may communicate directly with the base station 105-*b* using the communication link 225-*c*. Additionally, UE 115-*d* may be outside of the coverage area 110, and may not communicate using a direct link with the base station 105-*b* (e.g., UE 115-*d* may not have an established Uu or RRC connection with base station 105-*b*). In other cases, the UE 115-*d* may be inside the coverage area 110, but may not be able to communicate directly with the bases station 105-*b* (e.g., the UE 115-*d* may experience interference, reduced signal strength, or otherwise impeded communications). In such cases, the UE 115-*d* may communicate with the UE 115-*c* using the sidelink 230-*b*.

In the example of FIG. 2B, the group of UEs 115 may be in partial coverage (e.g., at least one of the UEs may communicate directly with the base station, and at least one other UE may be out of coverage). In such partial-coverage cases, the UE 115 that is in direct communication with the base station (e.g., UE 115-*c*) may act as a relay for information transmitted from the base station 105-*b*. For example, the UE 115-*c* may receive data or control information directly from the base station 105-*b* via communication link 225-*c* and may relay the information via sidelink 230-*b* to the UE 115-*d*. In such cases, the UE 115-*c* may assist communications between the base station 105-*b* and the out of coverage UE 115-*d*.

In the example of wireless communications system 200-*c*, one or more of a group of UEs 115 (e.g., UE 115-*e* and 115-*f*) may communicate outside of the coverage area 110 of the base station 105-*b* using a sidelink. In some examples, the UE 115-*e* and the UE 115-*f* may not have a direct connection to the base station 105-*c* due to both UEs 115 being outside of the geographic coverage area 110 of base station 105-*c*. In some other examples, the UEs 115 may be inside the geographic coverage area 110, but may not be able to communicate directly with the base station 105-*c* (e.g., due to interference, diminished signal strength, etc.). In such cases, the UEs 115 may be out of coverage and may not have a Uu or other direct connection established with the base station 105-*c*.

UE 115-*e* may be able to communicate directly with another UE 115-*f* (or with another group of UEs 115) over the sidelink 230-*c*. In such communications, the UEs 115 may communicate without direct connection to the base station 105-*c*. However, as illustrated in wireless communications systems 200-*a*, 200-*b*, and 200-*c*, there may be cases in which a UE 115 is outside coverage of a base station 105 and may lack a direct, (e.g., RRC) connection with the network while communicating with another UE 115 via one or more sidelinks 230. Such out-of-coverage UEs 115 may not regularly monitor for paging signals from the network, and some UEs 115 may also be unaware of other UEs 115 that may be transmitting via a sidelink communications link. The out-of-coverage UE 115 and in-coverage UE 115 may monitor sidelink resources (e.g., resource pools) for transmissions from other UEs 115. Such monitoring may be continuous, and the out-of-coverage UE 115 may unnecessarily consume power as a result.

As described herein, techniques may be used in wireless communications systems 200-*a*, 200-*b*, and 200-*c* to enable power saving at a device communicating via a sidelink 230. As an example, WUSs for sidelink communications may be transmitted to UEs 115. In such cases, different sets of sidelink resources may be associated with respective WUS occasions. As a result, a UE 115 may identify which resources are to be monitored for sidelink transmissions and may also identify the WUS occasions corresponding to the resources. As such, the UE 115 may periodically awake to monitor for a sidelink WUS, and the UE 115 may monitor for sidelink communications during the time periods indicated by a received sidelink WUS. Further aspects for power savings include the association of different MIMO layers with respective sets of sidelink resources, as well as using smaller BWPs when monitoring for WUSs and activating a larger BWP when a received WUS indicates to monitor for sidelink communications. Thus, the described techniques may provide for various degrees of power savings for UEs 115 communicating via sidelinks 230.

Figure 3A:
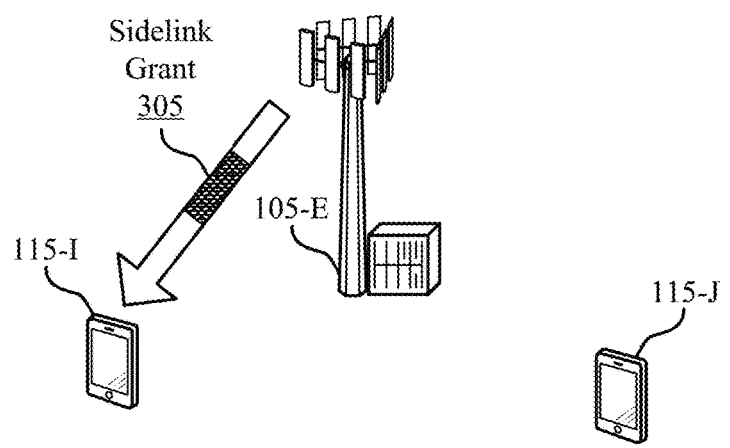
FIGS. 3A and 3B illustrate an example of a wireless communications system that support power saving techniques for sidelink communication in accordance with one or more aspects of the present disclosure.
Figure 3B:
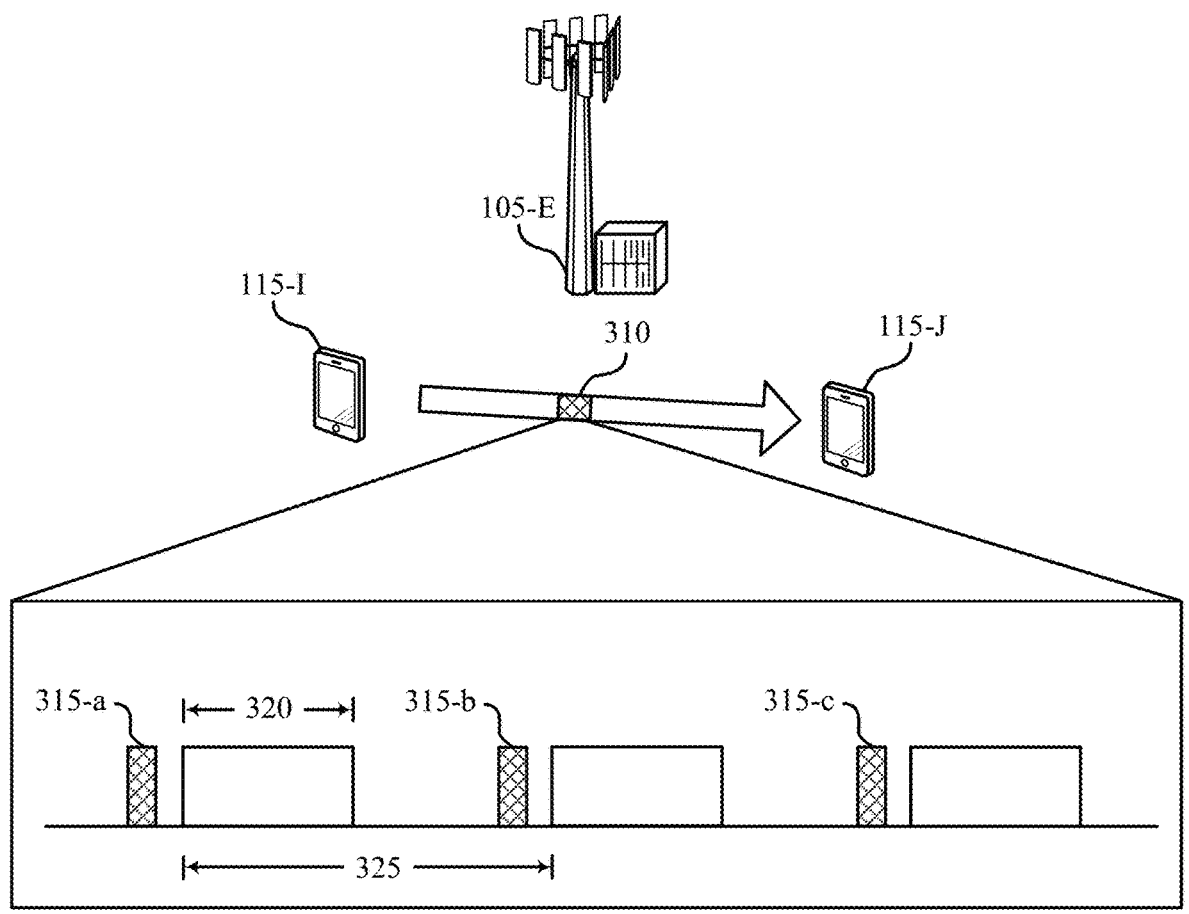

FIGS. 3A and 3B illustrate an example of wireless communications systems 300-*a* and 300-*b* that support power saving techniques for sidelink communication in accordance with one or more aspects of the present disclosure. In some examples, wireless communications systems 300-*a* and 300-*b* may implement aspects of wireless communications systems 100 and 200. For example, wireless communications system 300-*a* and 300-*b* each include a base station 105-*e* and one or more UEs 115 (e.g., UEs 115-*i* and UE 115-*j*), which may be examples of the corresponding devices described with reference to FIGS. 1, 2, and 3. Wireless communications system 300-*a* and 300-*b* may illustrate the signaling of WUSs for power saving when using sidelink communications.

In some cases, a network may use a WUS in techniques used at a device to further increase power savings. The network may implement WUS techniques for enhancing DRX communications which may be used by UEs 115-*i* and 115-*j*. The UEs 115-*i* and 115-*j* may be configured to monitor a control channel (e.g., a PDCCH, a PSCCH, etc.) according to the ON duration of a configured DRX cycle. For example, the UEs 115-*i* and 115-*j* may wake up from an idle mode during each ON duration of the DRX cycle to monitor for transmissions on the PDCCH or the PSCCH, and the UEs 115-*i* and 115-*j* may return to an idle or low power mode during each OFF duration of the DRX cycle. In some examples, a WUS sent by a UE 115-*i* to a UE 115-*j* on a sidelink can be triggered by a UE 115-*i* itself (e.g., when UE 115-*i* has data to transmit to UE 115-*j*, UE 115-*i* may trigger the transmission of the WUS). In some other examples, the transmission of the WUS may be triggered by the network (e.g., the base station 105-*e* directly or by the base station 105-*e* to a target UE through a relay device).

To enhance power saving at the UEs 115-*i* and 115-*j*, a number of WUS occasions may be configured in addition to the DRX configuration. Each WUS occasion may in some cases be a low-power signal that may be transmitted before each associated ON occasion of the DRX cycle. In some examples, the WUS may indicate to the UE 115 which ON occasions it may skip (e.g., which ON occasions of the DRX cycle that the UE 115 may remain in a low power state). Additionally or alternatively, the WUS may indicate to the UE 115 that it may expect to receive data in a following ON duration, such that the UE 115 may awake from low power mode. In some examples, the WUS may indicate to a UE 115 (e.g., independent of a DRX cycle) that the UE 115 is to wake up and stay up indefinitely, or that the UE 115 is to wake up and stay up for a specified duration of time (e.g., a duration of time specified by the WUS).

In some cases, such as in wireless communications system 300-*a*, the base station 105-*e* may receive an indication that the UE 115-*i* may communicate via sidelink communications with an out of coverage UE (e.g., UE 115-*j*). In such cases, the base station 105-*e* may transmit a sidelink grant 305 to the UE 115-*i*. The sidelink grant 305 may include information that the UE 115-*i* may use to communicate with the UE 115-*j*, for example, sidelink grant 305 may indicate a number of sidelink resources that the UE 115-*i* may use to communicate with the UE 115-*j*. In addition, the sidelink grant 305 may include a sidelink DRX configuration that the UE 115-*i* may transmit to the 115-*j* via the indicated sidelink resources. In some examples, the sidelink DRX configuration transmitted to the UE 115-*i* may include indication of WUS occasions associated with the indicated sidelink DRX configuration.

In some cases, after communicating with the base station 105-e, the UE 115-i may establish a sidelink with the UE 115-j using the sidelink resources that the base station 105-e indicates to the UE 115-i in the sidelink grant 305 described with reference to FIG. 3A. The UE 115-i may relay information it may receive from the base station 105-e to the UE 115-j, which may include sidelink DRX configuration information 310 and associated WUS configurations. In some other cases, the UE 115-i may select sidelink resources and a sidelink DRX configuration without direct communication with the base station 105-e.

The information 310 that is sent from UE 115-i to UE 115-j may, in some cases, include a DRX configuration for the UE 115-j. The DRX cycle may indicate time periods in which UE 115-j may monitor a control channel (e.g., a PDCCH, a PSCCH, etc.) according to the ON duration 320 of a configured DRX cycle. For example, the UE 115-j may wake up from an idle mode during each ON duration 320 of the DRX cycle to monitor for transmissions on the PDCCH or the PSCCH, and the UE 115-j may return to an idle or low power mode during each OFF duration of the DRX configuration. A DRX cycle duration 325 may be the time it may take to complete an ON duration and an OFF duration of the DRX configuration.

Before the start of each ON duration 320 of the sidelink DRX configuration, within a given offset, there may be a WUS occasion 315 to monitor for the PSCCH WUS. The UE 115-j may wake up to monitor for the PSCCH WUS during each WUS occasion 315 a-c, and if it receives the WUS, it may wake up for the associated ON duration. If the UE 115-j does not receive the PSCCH WUS during a WUS occasion 315, then it may remain in a sleep mode during the next ON duration. In some cases, and as described in further detail below, various sets of resources (e.g., resource pools) may be associated with WUS occasions used by the UE 115-j to wake up and monitor for PSCCH transmissions during a PSCCH period.

Figure 4:
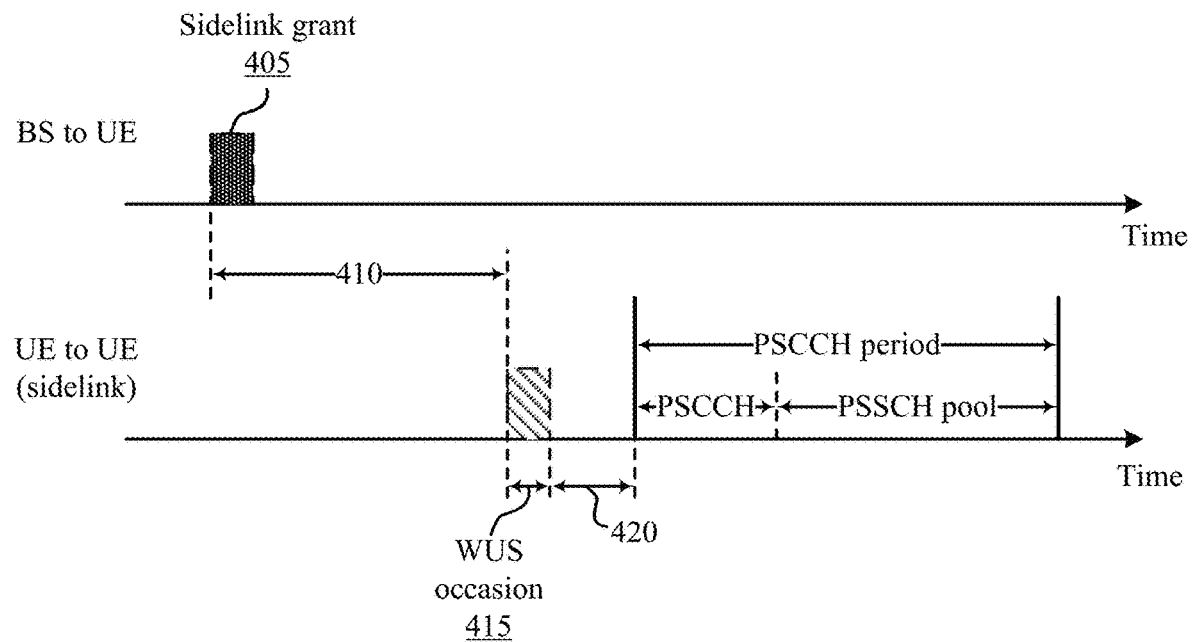
FIG. 4 illustrates an example of a resource allocation timeline that supports power saving techniques for sidelink communication in accordance with one or more aspects of the present disclosure.

FIG. 4 illustrates an example of a resource allocation timeline 400 that supports power saving techniques for sidelink communication in accordance with one or more aspects of the present disclosure. In some examples, resource allocation timeline 600 may implement aspects of wireless communications systems 100, 200, and 300.

In some cases, a single target UE 115 or group of target UEs 115 may receive data via a sidelink connection from one source UE 115. There may be a different source UE 115, however, that may attempt to connect with the multiple target UEs. In such cases (e.g., where the transmission is not unicast), WUS PDCCH may be implemented to manage or synchronize the DRX. WUS PDCCH or PSCCH signaling may also be implemented in such cases to enable increased power saving at the UEs 115. It is noted that a target UE 115 and a source UE 115 may correspond to an out-of-coverage UE 115 and an in-coverage UE 115, or vice versa. In other cases, both the target UE 115 and source UE 115 may both be in-coverage, or out-of-coverage, or any combination thereof. In any case, a WUS may be transmitted, over a sidelink communication link, between different UEs 115 irrespective of their coverage with a base station 105.

In some examples, a WUS may be implemented before each PSCCH period, where the PSCCH period indicates the period where PSCCH and a physical sidelink shared channel (PSSCH) may be sent together over a sidelink between UEs 115. In some examples, the WUS may map to a number of sidelink slots. Before each group of sidelink slots, there may be a monitoring occasion for the WUS that the UE may monitor and based on monitoring the monitoring occasion for the WUS, the UE 115 may determine whether it has to wake up during the associated sidelink slots or not. In some cases, the WUS may be implemented prior to a beginning of each resource pool period (e.g., a period including configured sidelink resource pools). As such, a PSCCH period may be correspond to or otherwise be referred to as a resource pool period. In some cases, a PSCCH period may contain a number of subframes, slots, and/or symbol periods (e.g., OFDM symbol periods) allocated for the PSCCH, and a number of additional subframes are allocated to the PSSCH data pool. In some cases, the PSCCH period may be associated with multiple PSSCH data pools. In some other implementations, each slot may contain both control and data (e.g., both PSCCH and PSSCH).

For sidelink communications, a WUS occasion 415 and an offset period 420 may be included a time period 410 before each PSCCH/PSSCH period. In some cases, the UE 115 may transmit PSCCH and PSSCH together in a single slot or during single time period. The transmitting UE 115 may receive a sidelink grant 405 from a base station, and the transmitting UE 115 may wait for the next PSCCH period according to a minimum offset time. The transmitting UE 115 may transmit a WUS to the receiving UE 115 during a WUS occasion 415. The receiving UE 115 may monitor the WUS occasion 415, which may be placed a certain offset period 420 before the start of the PSCCH period (the offset period 420 may separate the WUS occasion and the PSCCH period). The WUS may contain a UE ID or group ID such that if the target UE 115 detects a WUS with a matching ID, it may monitor the next PSCCH period or periods. If the target UE 115 does not receive a WUS during the WUS occasion 415, or if the UE ID or group ID does not indicate that the target UE 115 is to monitor the next PSCCH period, the target UE 115 may return to an idle mode and may not wake up to monitor the next PSCCH period. As described herein, a WUS may be transmitted on a sidelink by a UE 115 irrespective of its coverage status with a base station 105 (e.g., in-coverage, out-of-coverage, etc.). In such examples, a UE 115 that has data to transmit to another UE 115 over the sidelink may transmit a WUS to another UE 115, and the WUS (and corresponding WUS occasion) may point to one or more resource pools. In other examples, there may be one WUS occasion per resource pool.

In some examples, a UE 115 may relay uplink traffic for one or more other (e.g., out-of-coverage) UEs 115, which may provide for coverage enhancement in a system. In such cases, WUS transmissions from the out-of-coverage UEs may be distributed. In some cases, there may be a UE-specific WUS occasion per resource pool, or there may be a UE-specific WUS occasion for a group of resource pools.

Figure 5A:
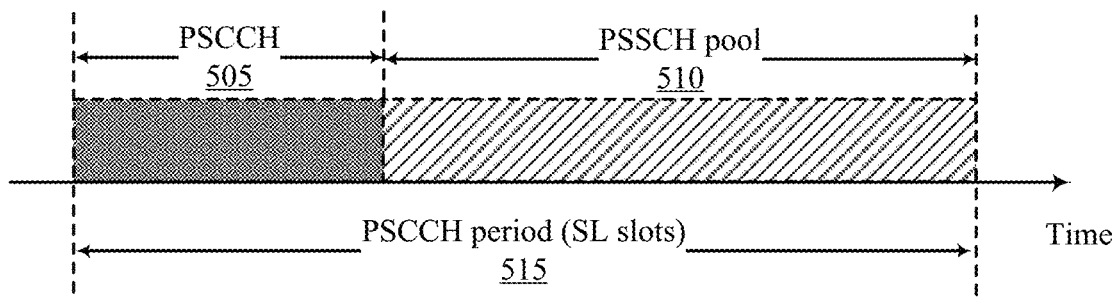
FIGS. 5A and 5B illustrate examples of control and data channel configurations that support power saving techniques for sidelink communication in accordance with one or more aspects of the present disclosure.
Figure 5B:
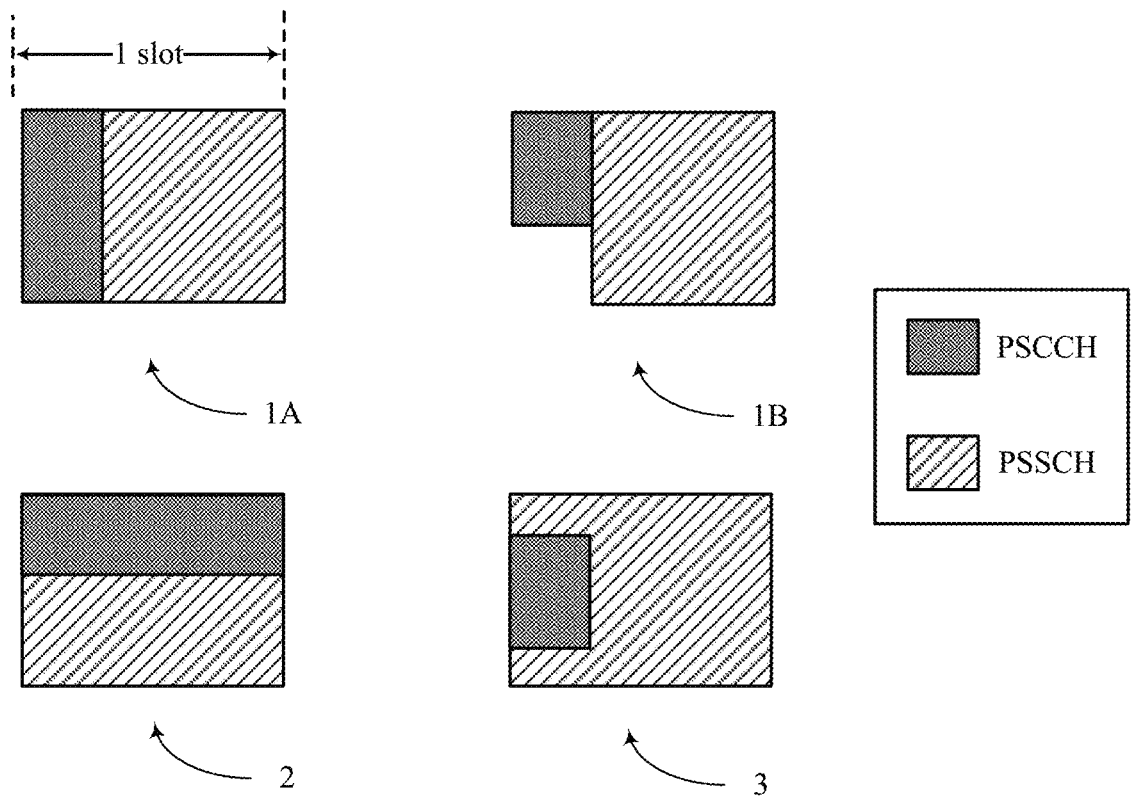

FIGS. 5A and 5B illustrates an example of control and data channel configurations 500-a and 500-b that supports power saving techniques for sidelink communication in accordance with one or more aspects of the present disclosure. In some examples, control and data channel configurations 500-a and 500-b may implement aspects of wireless communications systems 100, 200, and 300.

Figure 6:
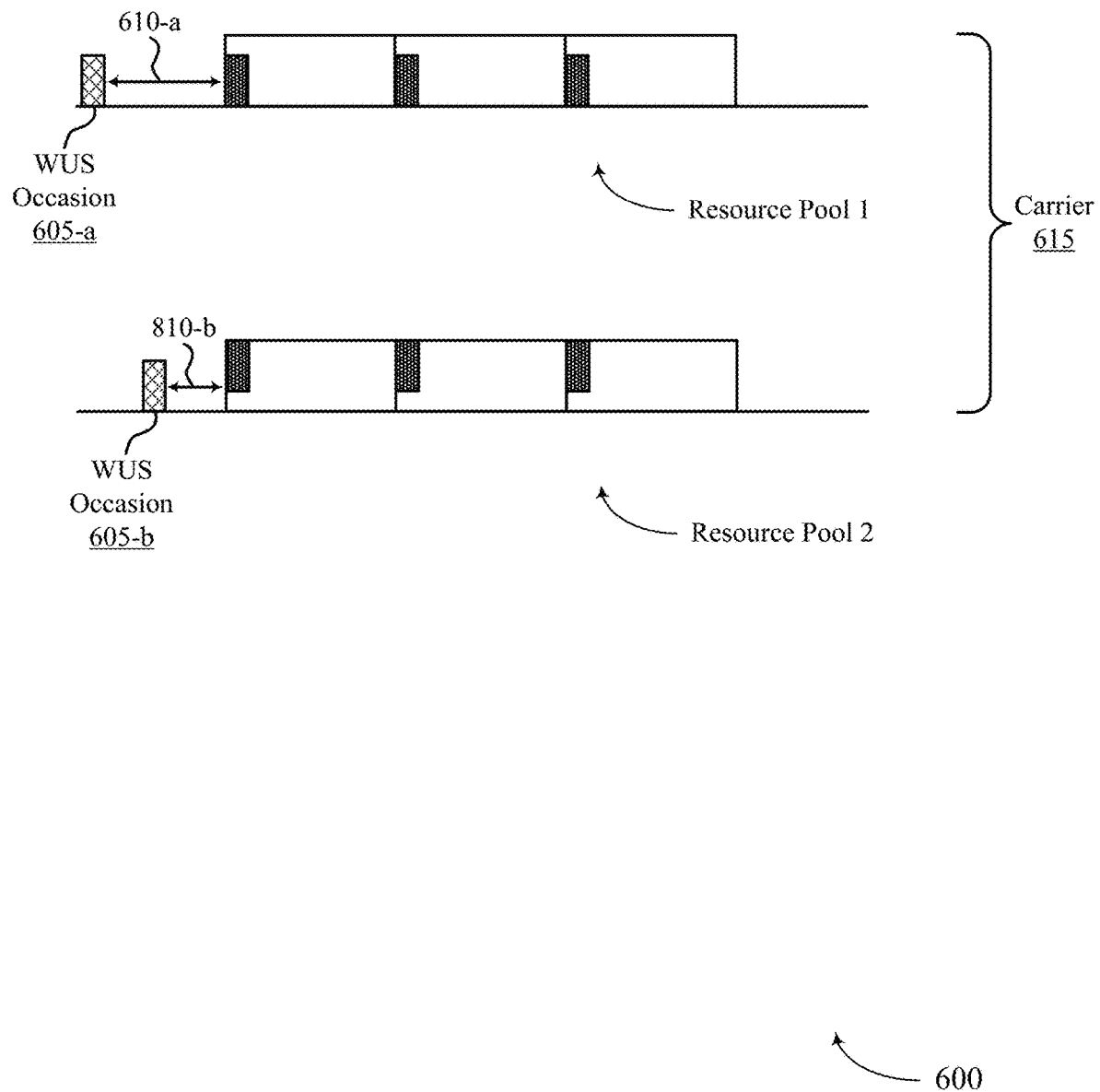
FIG. 6 illustrates an example of resource pools that supports power saving techniques for sidelink communication in accordance with one or more aspects of the present disclosure.

The PSCCH period as described, for example, with respect to FIG. 6, may include both control and data channel aspects. The PSCCH period 515 may be configured in various ways, and may include a number of sidelink slots. The configuration structure of 500-a includes the PSCCH period 515 (consisting of 40, 80, 160, or 320 ms duration), which may include a number or period of slots/subframes. The PSCCH 505 may, in some cases, include up to 40 subframes, and the PSCCH 505 may be transmitted at the beginning of the PSCCH period 515. A PSSCH data pool 510 may be included in the PSCCH period 515 following the PSCCH 505. The number of subframes that may be included in the PSCCH period may be derived, for example, based on a bitmap. The bitmap in some cases may be indicated using downlink control information (DCI) transmitted from the base station 105, or in some other cases, the DCI may be included as part of the resource pool configuration. The PSSCH bitmap may be repeated until the end of the PSCCH period.

Other configurations of the PSCCH period are possible, for example, the control and data aspects of the PSCCH period may be transmitted together (e.g., each PSCCH and PSSCH pool may be sent together in one slot). The configurations 500-b includes a number transmission configurations for the PSCCH and the PSSCH, for example, within the PSCCH period as described with reference to FIGS. 6-7A. Each combination of the PSCCH and the PSSCH may be located in the same slot (e.g., each PSCCH/PSSCH block combination may be transmitted in each slot). Additionally or alternatively, each PSCCH/PSSCH combination may span multiple slots (e.g., each PSCCH/PSSCH may be transmitted across multiple slots). In some examples, the configurations described for the PSCCH and PSSCH may be sent by a source UE 115 on a sidelink channel.

Configuration 1A shows an example where the PSCCH and the PSSCH may be transmitted using non-overlapping time resources. In configuration 1A, the frequency resources used by both the PSCCH and the PSSCH may be the same. Configuration 1B shows an example where the frequency resources used by both the PSCCH and the PSSCH may be different.

Configuration 2 shows an example where the PSCCH and the PSSCH may be transmitted using non-overlapping frequency resources which may be associated with time resources used for transmission. For example, the time resources used for transmitting the PSCCH and the PSSCH may be the same.

Configuration 3 shows an example where a portion of the PSCCH and the associated PSSCH may be transmitted using overlapping time resources in non-overlapping frequency resources. An additional portion of the associated PSSCH and/or an additional portion of the PSCCH may also be transmitted using non-overlapping time resources.

FIG. 6 illustrates an example of resource pool configurations 600 that support power saving techniques for sidelink communication in accordance with one or more aspects of the present disclosure. In some examples, resource pool configurations 600 may implement aspects of wireless communications systems 100, 200, and 300.

In some cases, a UE 115 may monitor a number of resource pools on carrier 615. The UE 115 may monitor the resource pools in order to determine a resource or a set of resources to use to transmit information, for example, via a sidelink.

A transmitting UE 115 may determine to use resources associated with either resource pool 1 or resource pool 2 to transmit to the receiving UE 115. In some cases, each resource pool may be associated with a WUS occasion 605. In some cases, the WUS occasion 605 may be offset from each resource pool by a different time period based on the different resource pools. For example, WUS occasion 605-a may be offset from resource pool 1 by an offset 610-a, and WUS occasion 605-b may be offset from resource pool 2 by an offset 610-b. According to some aspects, a receiving UE 115 may monitor the WUS occasions 605-a and 605-b associated with each resource pool, and the receiving UE 115 may determine, based on the monitoring, whether it may stay awake for monitoring the PSSCH and for associated data to be transmitted in the PSSCH period.

In some cases, there may be one WUS occasion per BWP (each WUS may be a PDCCH transmitted through a PDCCH). Within a data payload of the PDCCH WUS, the transmitting UE 115 may include the ID of the resource pools that it may use to transmit data. Additionally or alternatively, one WUS PDCCH may indicate (for example, using a bitmap) which one of the resource pools may be monitored by the receiving UE 115.

The BWP containing the WUS PDCCH or WUS sequence may be a default size. The UE 115 may monitor for the WUS PDCCH in the default BWP according to the default size of the WUS PDCCH, which may in some cases be smaller than the PSCCH period. However, when the UE is indicated to start monitoring the PSCCH, the PSCCH/PSSCH BWP may be larger than the WUS occasion, and the UE 115 may monitor the PSCCH for a longer period of time.

In another example, a WUS may be used to activate a sidelink BWP (or may be used to change the size of the sidelink BWP) in cases where multiple sidelink BWPs are configured. In such cases, the resource indication of the WUS indicates the resource pools of the activated BWP. The UE 115 may then determine which BWP may be used. In such cases, the BWP size may be adjusted based on the traffic/data that may be communicated over sidelink communications.

Each WUS may further indicate (for example, using a bitmap), a number of slots or a group of slots where the PSCCH may be monitored (per resource pool, or for all the resource pools). The transmitting UE 115 may transmit in only some of the slots, so the bitmap included in the WUS may indicate the number of slots or group of slots whether the receiving UE should monitor the PSCCH (e.g., in-between every two WUS occasions). For example, a 10-bit bitmap may indicate 10 occasions to monitor PSCCH. Additionally, if the resource pool transmission is periodic, the bitmap may include 10 occasions to monitor PSCCH within each period. In such cases, whichever occasions are not indicated by the bitmap may not be monitored by the UE 115.

Figure 7A:
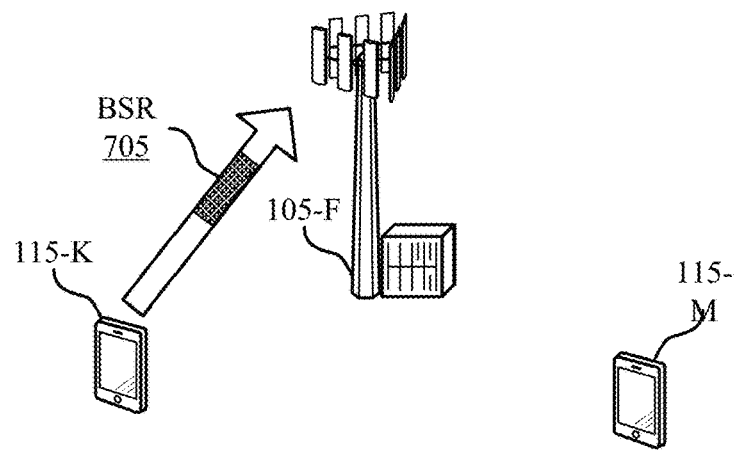
FIGS. 7A and 7B illustrate examples of wireless communications systems that support power saving techniques for sidelink communication in accordance with one or more aspects of the present disclosure.
Figure 7B:
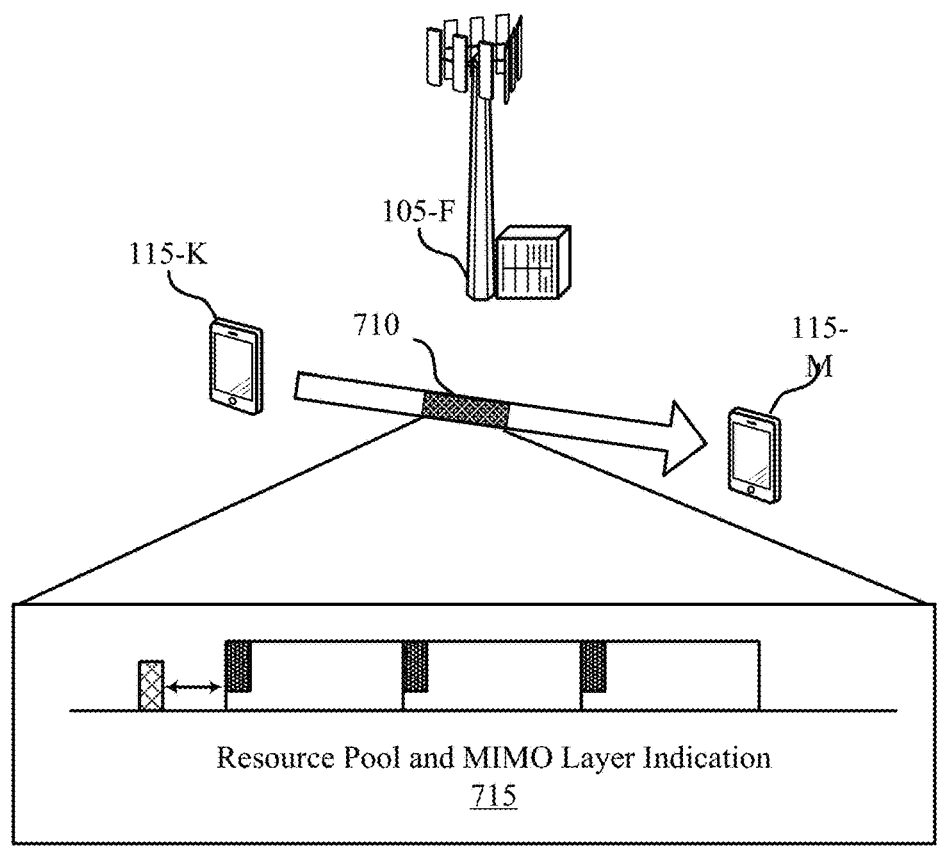

FIGS. 7A and 7B illustrate examples of wireless communications systems 700-a and 700-b that support power saving techniques for sidelink communication in accordance with one or more aspects of the present disclosure. In some examples, wireless communications systems 700-a and 700-b may implement aspects of wireless communications systems 100, 200, and 300. For example, wireless communications system 700-a and 700-b each include a base station 105-f and one or more UEs 115 (e.g., UEs 115-k and UE 115-m), which may be examples of the corresponding devices described with reference to FIGS. 1, 2, and 3. Wireless communications systems 700-a and 700-b may illustrate different resource pools associated with different numbers of MIMO layers.

In some examples, different resource pools monitored by a UE 115 may be associated with different numbers of MIMO layers used for different kinds of transmissions. For example, a given number of MIMO layers (e.g., 4 layers) may be used to transmit high data rate (HDR) transmissions, and a different number of MIMO layers (e.g., 2 layers) may be used to transmit other types of transmissions. The number of layers used for receiving data in some cases may be less than the number of layers used to transmit data, therefore, in some cases a receiving UE 115 may turn off some of its functionality when receiving data, which may increase power savings.

A UE 115-k may receive, from base station 105-f, an indication of resources it may use to transmit via a sidelink with UE 115-m. According to a first mode (e.g., Mode 1, where the base station 105-f indicates the sidelink resources to the UE 115-k), the base station 105-f may use a buffer status report (BSR) 705 for sidelink transmissions to schedule the sidelink resources over a resource pool according to a configured number of MIMO layers.

In another example, according to a second mode (e.g., Mode 2, where the transmitting UE 115-k indicates the sidelink resources to UE 115-m), the transmitting UE 115-k may select a resource pool with a configured number of MIMO layers 715. In some cases, when the UE 115-k determines which resource pool to use to transmit data, it may also determine the number of MIMO layers each resource pool is associated with. The UE 115-k may relay the indication 710 of the resource pool and MIMO layer indication to the UE 115-m. For example, if a resource pool is associated with four MIMO layers, a UE 115 may receive the PSSCH associated with those four MIMO layers. However, if the UE 115 determines that it may transmit information according to only 2 layers, the UE 115 may turn off some of its antennas associated with higher level layers and may receive with two layers. The MIMO layers may be associated with the resource pool configuration, so a transmitting device may know the number of layers associated with each resource pool. For example, if a UE 115 receives an indication that a resource pool is configured for up to two MIMO layers, it may accordingly adjust its functionality to account for the configuration (e.g., it may turn on antennas needed to detect only two layers). Therefore, the WUS may also be used to modify the number of MIMO layers by indicating which resource pool may be monitored.

Figure 8:
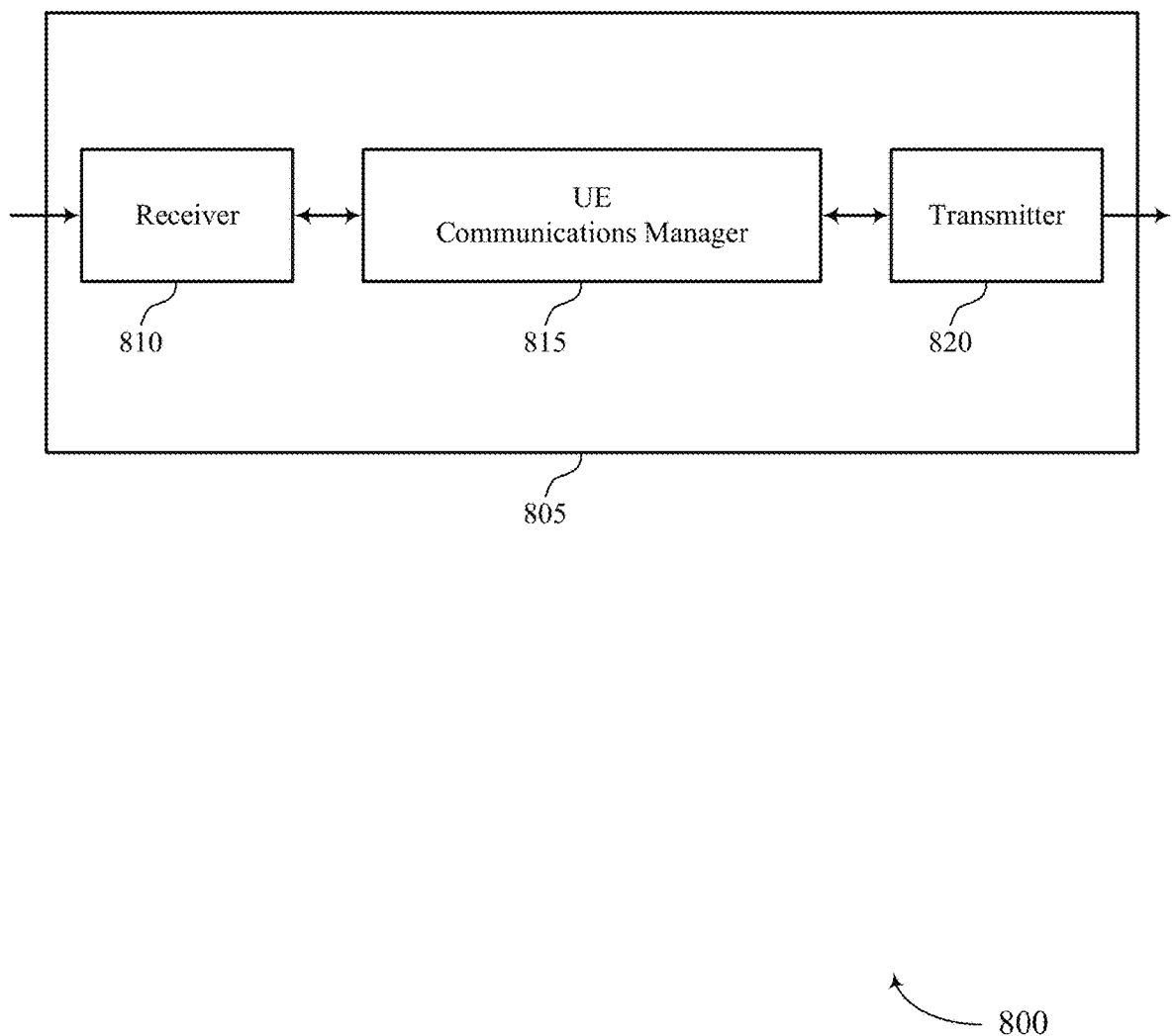
FIGS. 8 and 9 show block diagrams of devices that support power saving techniques for sidelink communication in accordance with one or more aspects of the present disclosure.

FIG. 8 shows a block diagram 800 of a device 805 that supports power saving techniques for sidelink communication in accordance with one or more aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may provide a means for receiving information such as packets, user data, or control information associated with various information channels (e.g., control channels, data channels, and information related to power saving techniques for sidelink communication, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may be configured to provide or support a means for identifying a set of one or more resources for sidelink communication with a second UE over a sidelink communication link, transmitting, to the second UE, a WUS over the sidelink communication link, the WUS transmitted during a WUS occasion that is associated with the set of one or more resources, and transmitting, based on the WUS, a message to the second UE using the set of one or more resources. The UE communications manager 815 may also be configured to provide or support a means for identifying a set of one or more resources for sidelink communication with a second UE over a sidelink communication link, receiving, from the second UE, a WUS over the sidelink communication link, the WUS received based on monitoring a WUS occasion that is associated with the set of one or more resources, and monitoring the identified set of one or more resources for a transmission from the second UE based on the received WUS. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. The UE communications manager may be an example of means for performing various aspects of power saving techniques for sidelink communication as described herein. The communications manager 815, or its sub-components, may be implemented in hardware (e.g., in communications management circuitry). The communications manager 815, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the UE communications manager 815, or its sub-components may be executed in code (e.g., as communications management software or firmware), executed by a processor, or any combination thereof. If implemented in code executed by the processor, the functions of the UE communications manager 815, or its sub-components may be executed by a general-purpose processor, a DSP, ASIC, an FPGA, or other programmable logic device, discrete gate or transistor logic, discrete hardware components, or any combination thereof designed to perform the functions described in the present disclosure.

In some examples, the communication manager 815 may be configured to perform various operations (e.g., identifying, transmitting, etc.) using or otherwise in cooperation with the receiver 810, the transmitter 820, or both.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may provide a means for transmitting signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, UE communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

The UE communications manager 815 as described herein may be implemented to realize one or more potential advantages. Various implementations may enable the UE communications manager 815 to effectively receive and process WUSs for sidelink and direct link communications between devices in a wireless network. At least one implementation may enable the UE communications manager 815 to effectively use MIMO techniques for resource selection to further power savings for sidelink.

Based on implementing the power saving techniques as described herein, one or more processors of the device 805 (e.g., processor(s) controlling or incorporated with one or more of receiver 810, the UE communications manager 815, and transmitter 820) may reduce the amount of time a device is awake and consuming excess power, which may increase power savings. In addition, the processors of the device 805 may be configured to selectively monitor resource pools to reduce excess wake time while monitoring for sidelink resources.

Figure 9:
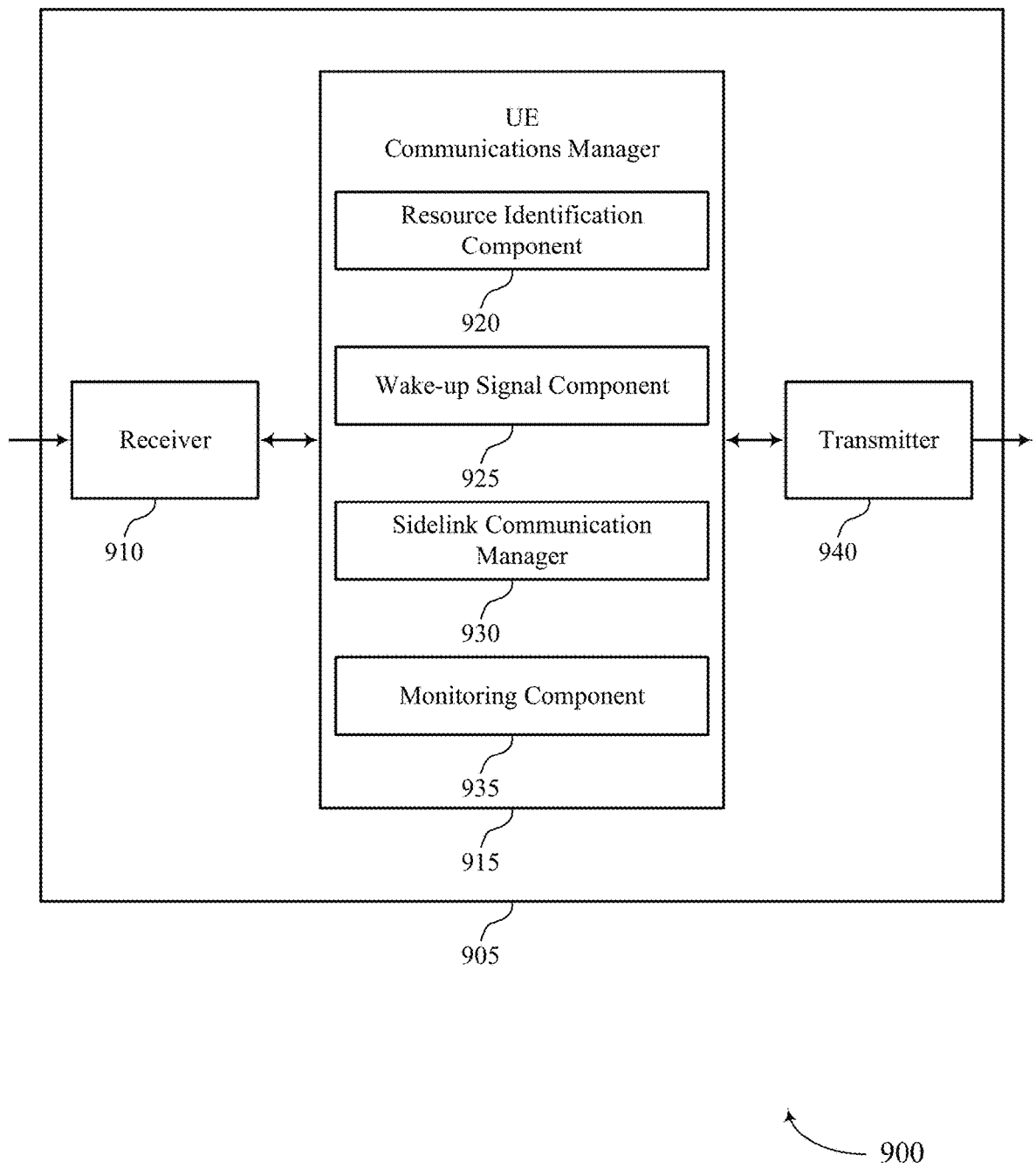

FIG. 9 shows a block diagram 900 of a device 905 that supports power saving techniques for sidelink communication in accordance with one or more aspects of the present disclosure. The device 905 may be an example of aspects of a device 805, or a UE 115 as described herein. The device 905 may include a receiver 910, a UE communications manager 915, and a transmitter 940. The device 905 may also include a processor. Each of these components may be in communication with one another (e.g., via one or more buses).

The receiver 910 may provide a means for receiving information such as packets, user data, or control information associated with various information channels (e.g., control channels, data channels, and information related to power saving techniques for sidelink communication, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a resource identification component 920, a wake-up signal component 925, a sidelink communication manager 930, and a monitoring component 935. The UE communications manager 915 may be an example of aspects of the UE communications manager 1110 described herein.

The resource identification component 920 may provide a means for identifying a set of one or more resources for sidelink communication with a second UE over a sidelink communication link.

The wake-up signal component 925 may provide a means for transmitting, to the second UE, a WUS over the sidelink communication link, the WUS transmitted during a WUS occasion that is associated with the set of one or more resources.

The sidelink communication manager 930 may provide a means for transmitting, based on the WUS, a message to the second UE using the set of one or more resources.

The wake-up signal component 925 may provide a means for receiving, from the second UE, a WUS over the sidelink communication link, the WUS received based on monitoring a WUS occasion that is associated with the set of one or more resources.

The monitoring component 935 may provide a means for monitoring the identified set of one or more resources for a transmission from the second UE based on the received WUS.

The transmitter 940 may provide a means for transmitting signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
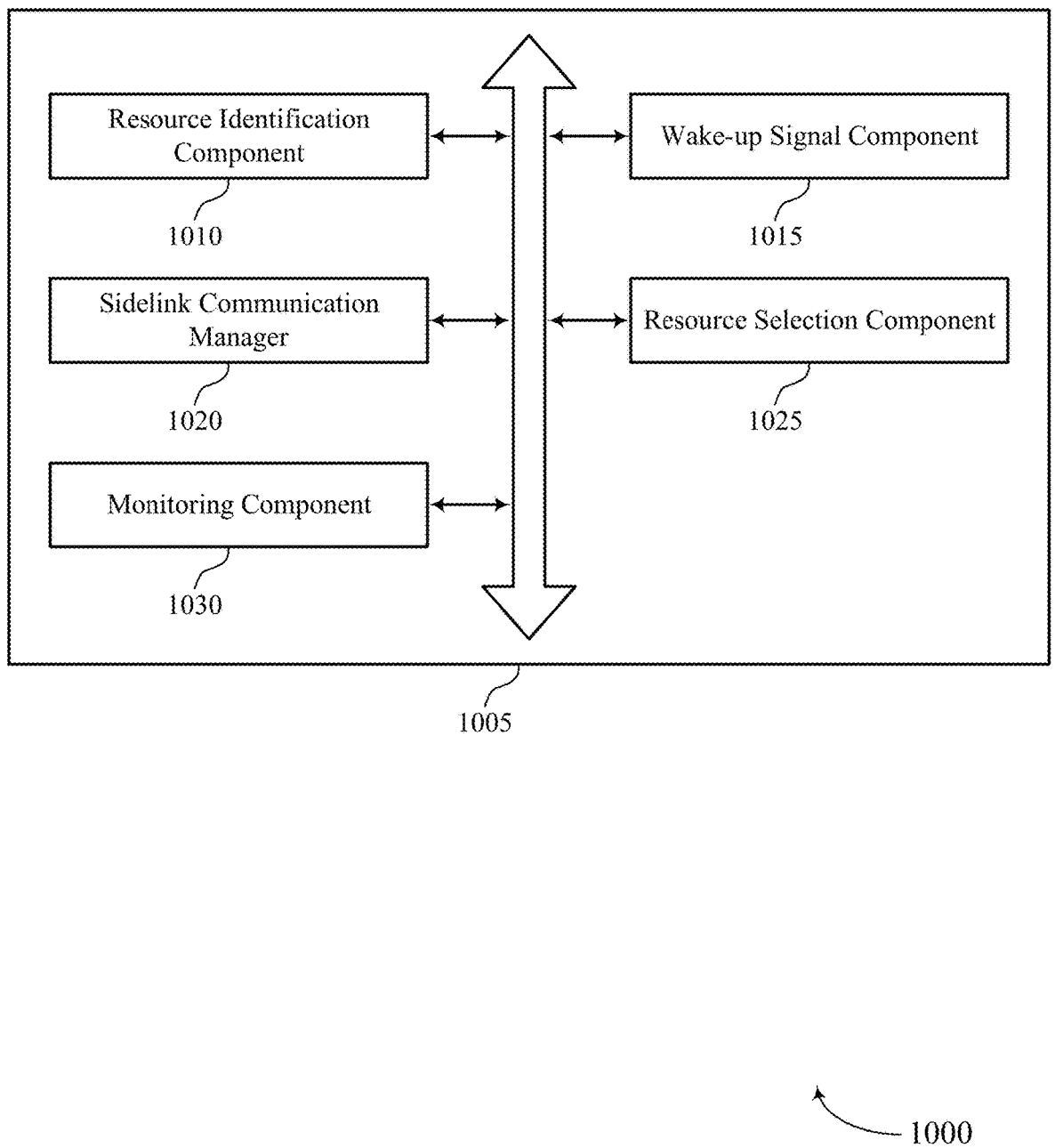
FIG. 10 shows a block diagram of a UE communications manager that supports power saving techniques for sidelink communication in accordance with one or more aspects of the present disclosure.

FIG. 10 shows a block diagram 1000 of a UE communications manager 1005 that supports power saving techniques for sidelink communication in accordance with one or more aspects of the present disclosure. The UE communications manager 1005 may be an example of aspects of a UE communications manager 815, a UE communications manager 915, or a UE communications manager 1110 described herein. The UE communications manager 1005 may include a resource identification component 1010, a wake-up signal component 1015, a sidelink communication manager 1020, a resource selection component 1025, and a monitoring component 1030. Each of these modules may communicate, directly or indirectly, with one another (e.g., via one or more buses).

The resource identification component 1010 may identify a set of one or more resources for sidelink communication with a second UE over a sidelink communication link. In some examples, the resource identification component 1010 may receive, from a base station, a resource grant indicating the set of one or more resources for the sidelink communication, where the WUS associated with the set of one or more resources is transmitted based on the resource grant.

In some examples, the resource identification component 1010 may provide a means for identifying the set of one or more resources based on the received WUS. In some examples, the resource identification component 1010 may provide a means for identifying a bitmap that indicates the set of one or more resources based on the WUS. In some cases, the set of one or more resources are associated with a number of MIMO layers.

In some cases, the set of one or more resources are from a plurality of sets of resources for the sidelink communication, each set of the plurality of sets of resources being associated with respective WUS occasions. In some cases, each set of the plurality of sets of resources is associated with a respective number of MIMO layers.

The wake-up signal component 1015 may provide a means for transmitting, to the second UE, a WUS over the sidelink communication link, the WUS transmitted during a WUS occasion that is associated with the set of one or more resources. In some examples, the wake-up signal component 1015 may provide a means for receiving, from the second UE, a WUS over the sidelink communication link, the WUS received based on monitoring a WUS occasion that is associated with the set of one or more resources. In some examples, transmitting the WUS in a first BWP of the sidelink communication link, where transmitting the message includes transmitting the message in a second BWP that is different from the first BWP. In some cases, the second BWP is from a set of BWPs associated with the sidelink communication.

The sidelink communication manager 1020 may provide a means for transmitting, based on the WUS, a message to the second UE using the set of one or more resources. In some examples, the sidelink communication manager 1020 may provide a means for identifying one or more groups of slots for transmitting the message. In some examples, the sidelink communication manager 1020 may provide a means for transmitting the message during at least one of the one or more groups of slots, where the WUS indicates the one or more groups of slots to the second UE.

In some examples, the sidelink communication manager 1020 may provide a means for transmitting the message during one or more sidelink control channel periods, each sidelink control channel period including a physical sidelink control channel and a physical sidelink shared channel. In some cases, the one or more groups of slots are indicated to the second UE via a bitmap or a sequence. In some cases, each sidelink control channel period has a duration of a slot.

The monitoring component 1030 may provide a means for monitoring the identified set of one or more resources for a transmission from the second UE based on the received WUS. In some examples, the monitoring component 1030 may provide a means for identifying one or more groups of slots based on an indication associated with the received WUS, where monitoring the identified set of one or more resources for the transmission from the second UE is performed during each of the one or more groups of slots.

In some examples, the monitoring component 1030 may provide a means for refraining from monitoring one or more groups of time periods based on the indication, the one or more groups of time periods including symbol periods, or slots, or a combination thereof. In some examples, monitoring for the WUS in a first BWP of the sidelink communication link, where monitoring the set of one or more resources for the transmission includes monitoring a second BWP that is different from the first BWP.

In some examples, the monitoring component 1030 may provide a means for monitoring the set of one or more resources during one or more sidelink control channel periods, each sidelink control channel period including a physical sidelink control channel and a physical sidelink shared channel. In some cases, the indication includes a bitmap associated with the WUS. In some cases, the second BWP is from a set of BWPs associated with the sidelink communication. In some cases, each sidelink control channel period has a duration of a slot.

In some cases, the physical sidelink control channel and the physical sidelink shared channel are non-overlapping in time, or non-overlapping in frequency, or overlapping in time, or overlapping in frequency, or any combination thereof.

The resource selection component 1025 may select the set of one or more resources from a plurality of sets of resources for the sidelink communication, each set of the plurality of sets of resources being associated with respective WUS occasions, where the WUS associated with the set of one or more resources is transmitted based on the selected set of one or more resources.

In some examples, the resource selection component 1025 may determine a number of MIMO layers for communicating with the second UE over the sidelink communication link, where the set of one or more resources are selected based on the determined number of MIMO layers.

Figure 11:
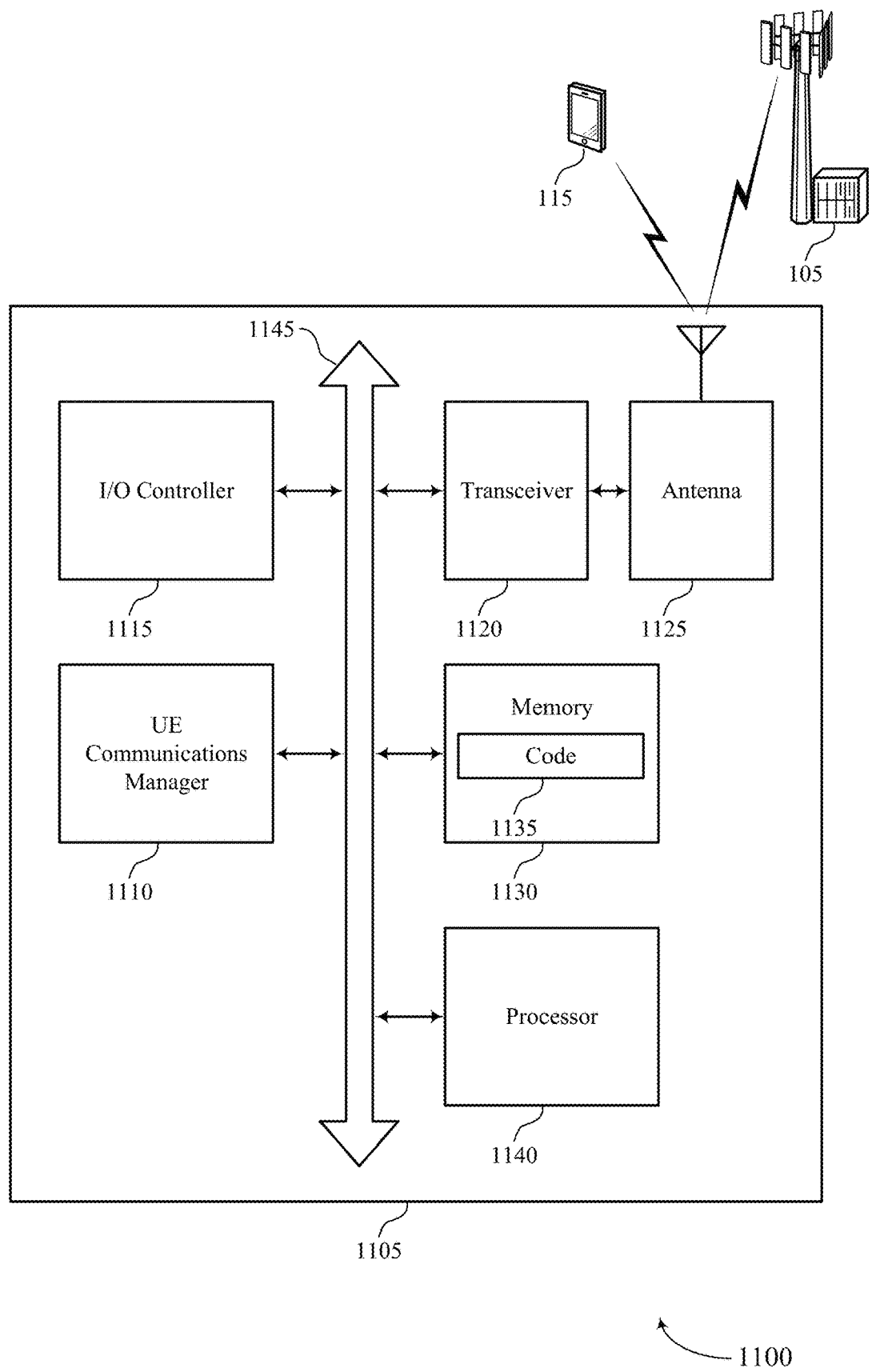
FIG. 11 shows a diagram of a system including a device that supports power saving techniques for sidelink communication in accordance with one or more aspects of the present disclosure.

FIG. 11 shows a diagram of a system 1100 including a device 1105 that supports power saving techniques for sidelink communication in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may be configured to provide or support a means for identifying a set of one or more resources for sidelink communication with a second UE over a sidelink communication link, transmitting, to the second UE, a WUS over the sidelink communication link, the WUS transmitted during a WUS occasion that is associated with the set of one or more resources, and transmitting, based on the WUS, a message to the second UE using the set of one or more resources. The UE communications manager 1110 may also be configured to provide or support a means for identifying a set of one or more resources for sidelink communication with a second UE over a sidelink communication link, receiving, from the second UE, a WUS over the sidelink communication link, the WUS received based on monitoring a WUS occasion that is associated with the set of one or more resources, and monitoring the identified set of one or more resources for a transmission from the second UE based on the received WUS.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting power saving techniques for sidelink communication).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
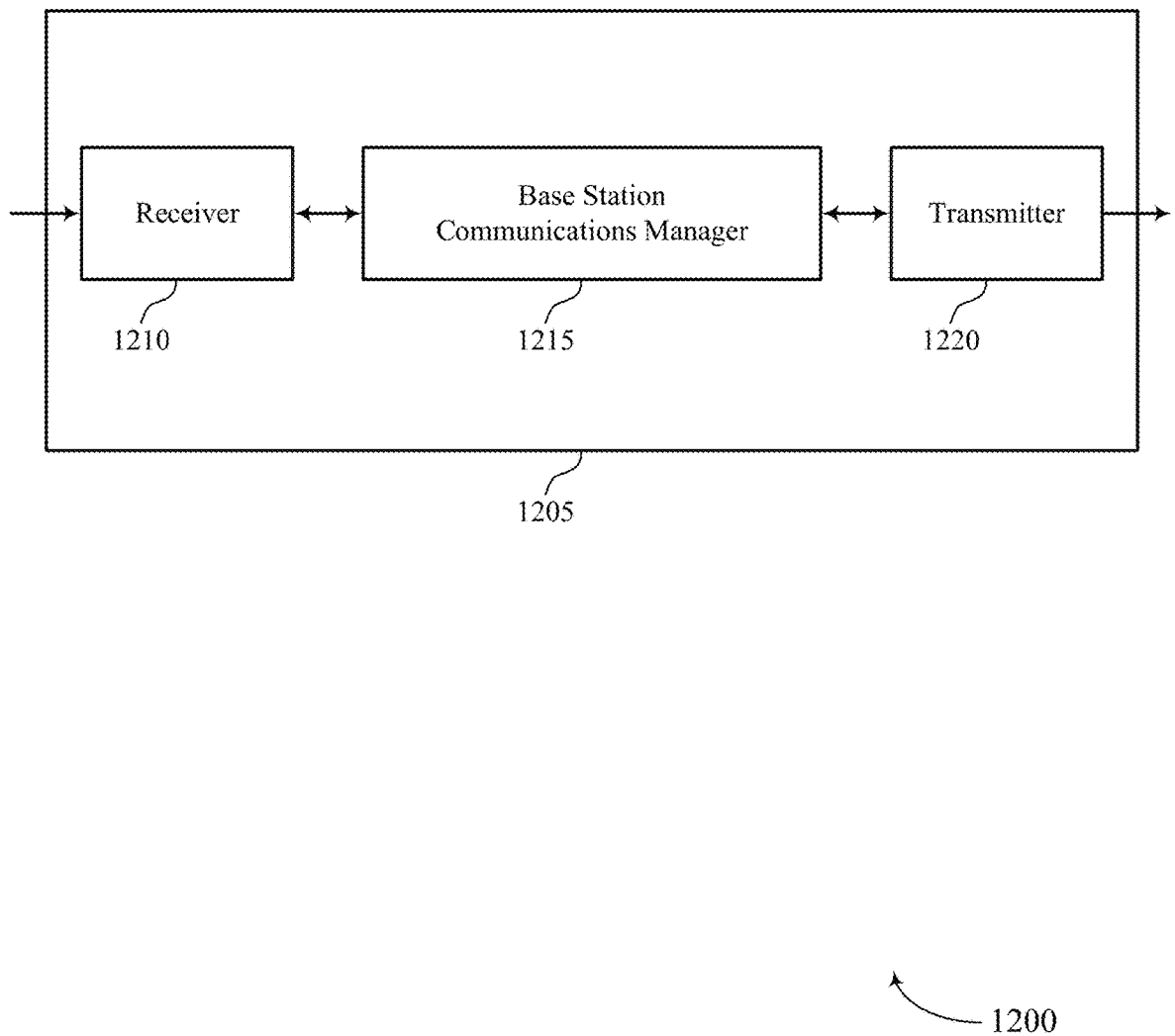
FIGS. 12 and 13 show block diagrams of devices that support power saving techniques for sidelink communication in accordance with one or more aspects of the present disclosure.

FIG. 12 shows a block diagram 1200 of a device 1205 that supports power saving techniques for sidelink communication in accordance with one or more aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to power saving techniques for sidelink communication, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may identify a set of one or more resources for sidelink communication between a first UE and second UE over a sidelink communication link, where the set of one or more resources are associated with one or more WUS occasions and transmit, to the first UE, a resource grant scheduling the set of one or more resources on the sidelink communication link. The base station communications manager 1215 may be an example of aspects of the base station communications manager 1510 described herein.

The base station communications manager 1215 may be an example of means for performing various aspects of power saving techniques for sidelink communications as described herein. The communications manager 1215, or its sub-components, may be implemented in hardware (e.g., in communications management circuitry). The circuitry may comprise of processors, a DSP, an ASIC, an FPGA or other programmable logic device, discrete gate or transistor logic, discrete hardware components, or any combination thereof designed to perform the functions described in the present disclosure.

In another implementation, the base station communications manager 1215, or its sub-components, may be implemented in hardware, code (e.g., communications management software or firmware) executed by a processor, or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

In some examples, the base station communications manager 1215 may be configured to perform various operations (e.g., identifying, transmitting) using or otherwise in cooperation with the receiver 1210, the transmitter 1220, or both.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
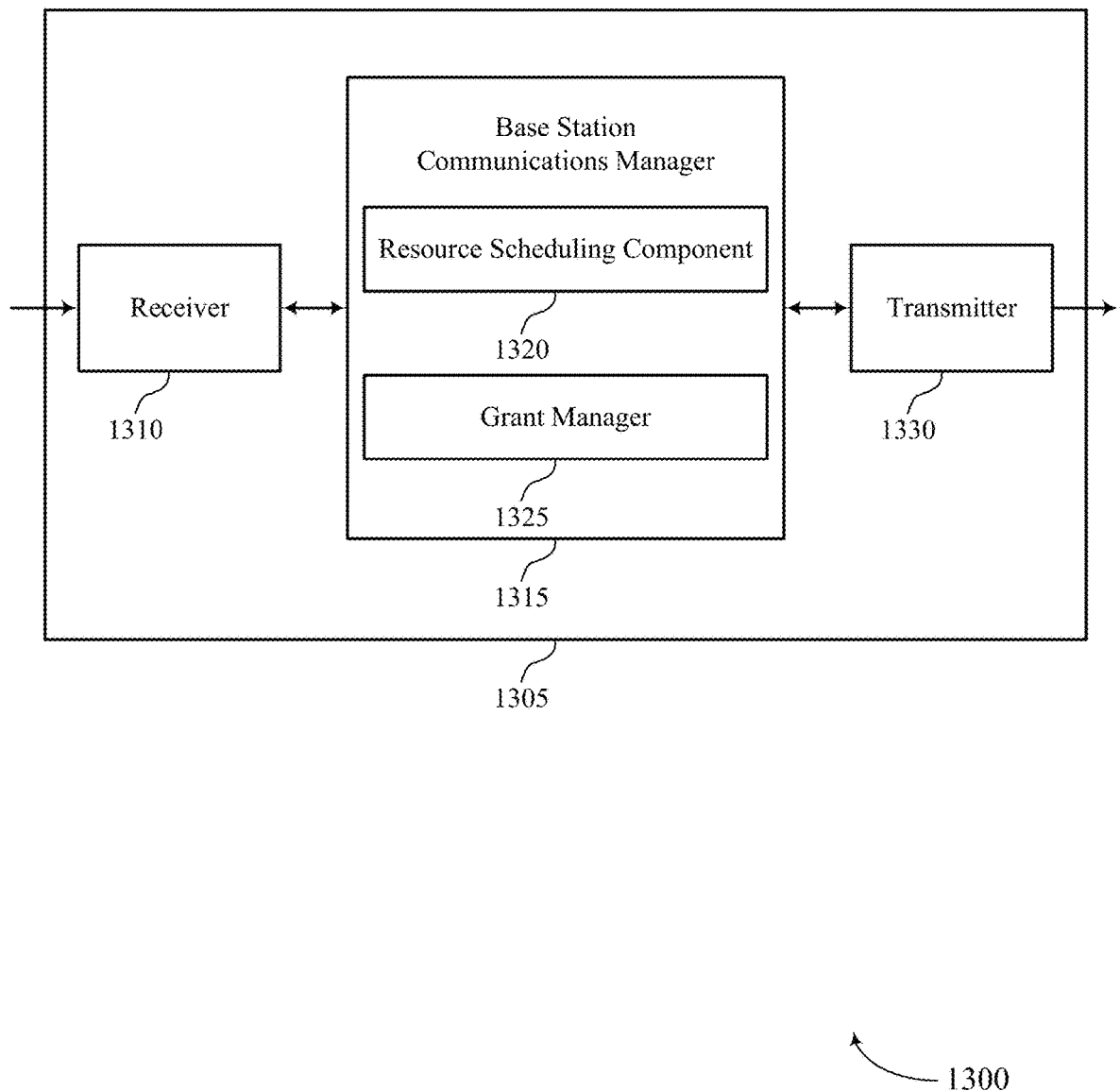

FIG. 13 shows a block diagram 1300 of a device 1305 that supports power saving techniques for sidelink communication in accordance with one or more aspects of the present disclosure. The device 1305 may be an example of aspects of a device 1205, or a base station 105 as described herein. The device 1305 may include a receiver 1310, a base station communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to power saving techniques for sidelink communication, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a resource scheduling component 1320 and a grant manager 1325. The base station communications manager 1315 may be an example of aspects of the base station communications manager 1510 described herein.

The resource scheduling component 1320 may identify a set of one or more resources for sidelink communication between a first UE and second UE over a sidelink communication link, where the set of one or more resources are associated with one or more WUS occasions.

The grant manager 1325 may transmit, to the first UE, a resource grant scheduling the set of one or more resources on the sidelink communication link.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
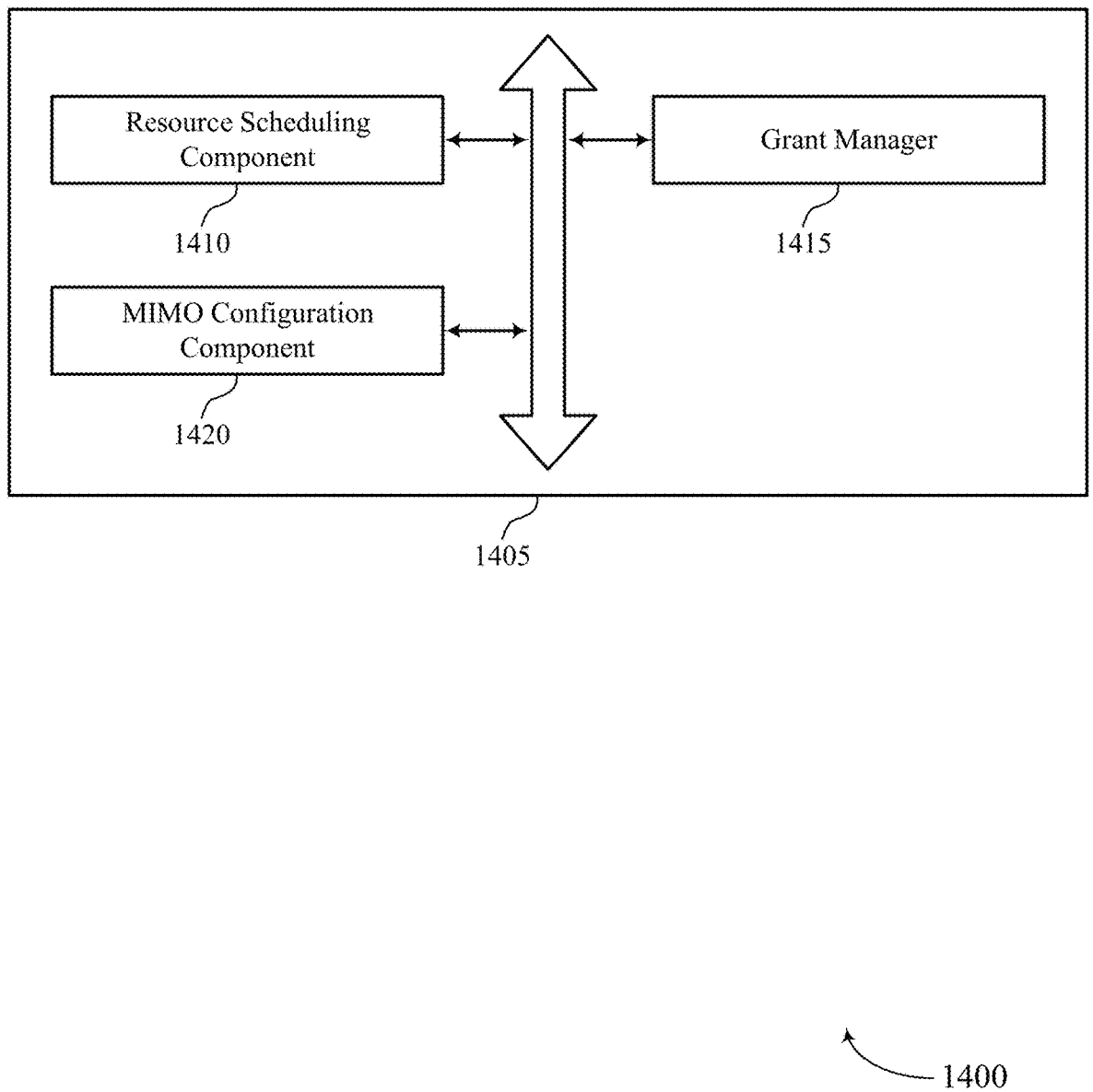
FIG. 14 shows a block diagram of a base station communications manager that supports power saving techniques for sidelink communication in accordance with one or more aspects of the present disclosure.

FIG. 14 shows a block diagram 1400 of a base station communications manager 1405 that supports power saving techniques for sidelink communication in accordance with one or more aspects of the present disclosure. The base station communications manager 1405 may be an example of aspects of a base station communications manager 1215, a base station communications manager 1315, or a base station communications manager 1510 described herein. The base station communications manager 1405 may include a resource scheduling component 1410, a grant manager 1415, and a MIMO configuration component 1420. Each of these modules may communicate, directly or indirectly, with one another (e.g., via one or more buses).

The resource scheduling component 1410 may identify a set of one or more resources for sidelink communication between a first UE and second UE over a sidelink communication link, where the set of one or more resources are associated with one or more WUS occasions.

In some examples, the resource scheduling component 1410 may select the set of one or more resources from a plurality of sets of resources for the sidelink communication, each set of the plurality of sets of resources being associated with respective WUS occasions.

In some cases, the set of one or more resources includes one or more sidelink control channel periods, each sidelink control channel period including a physical sidelink control channel and a physical sidelink shared channel.

In some cases, each sidelink control channel period has a duration of a slot.

The grant manager 1415 may transmit, to the first UE, a resource grant scheduling the set of one or more resources on the sidelink communication link.

The MIMO configuration component 1420 may determine a number of multiple input multiple output (MIMO) layers for the sidelink communication, where the set of one or more resources are selected based on the determined number of MIMO layers.

Figure 15:
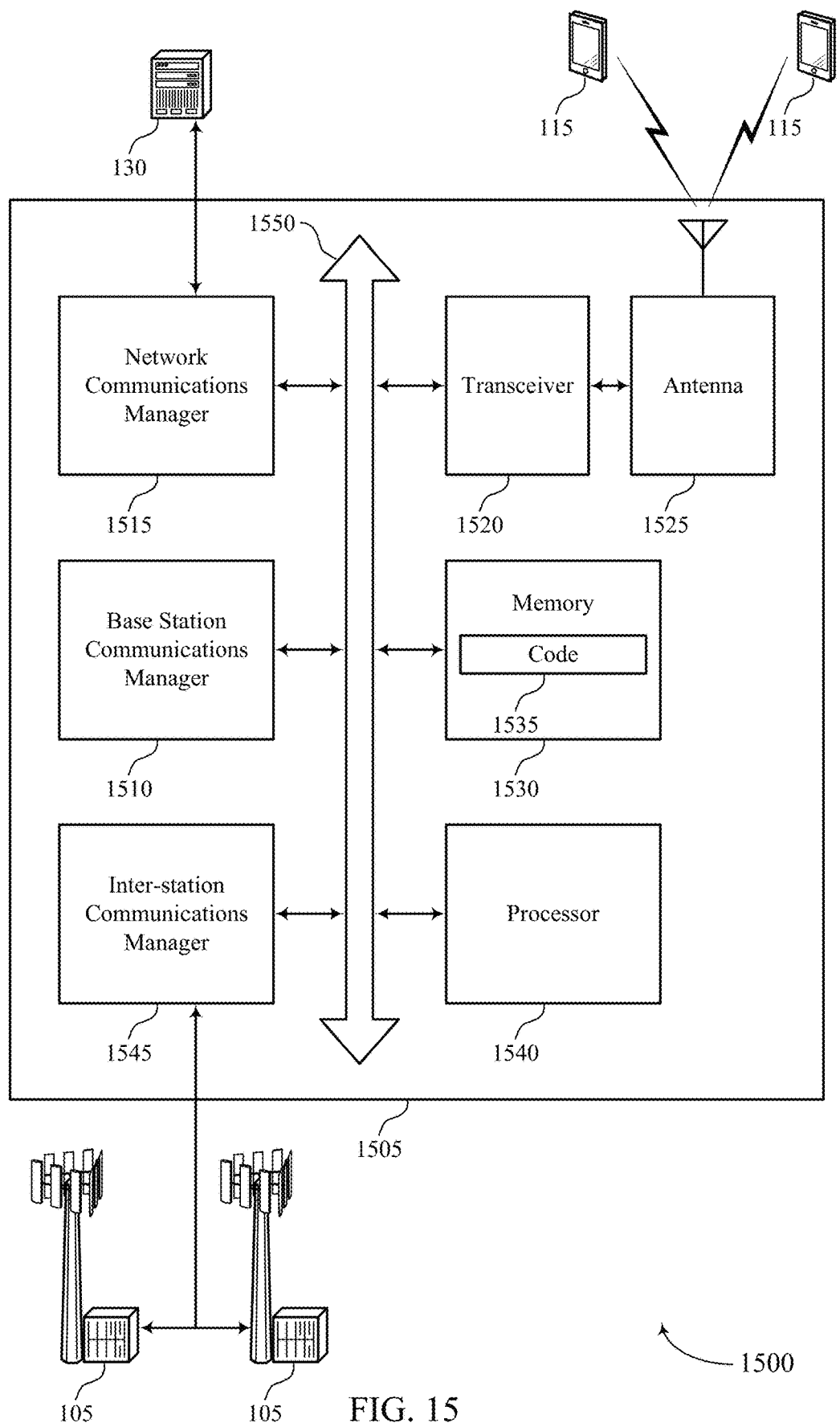
FIG. 15 shows a diagram of a system including a device that supports power saving techniques for sidelink communication in accordance with one or more aspects of the present disclosure.

FIG. 15 shows a diagram of a system 1500 including a device 1505 that supports power saving techniques for sidelink communication in accordance with one or more aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may identify a set of one or more resources for sidelink communication between a first UE and second UE over a sidelink communication link, where the set of one or more resources are associated with one or more WUS occasions and transmit, to the first UE, a resource grant scheduling the set of one or more resources on the sidelink communication link.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting power saving techniques for sidelink communication).

The inter-station communications manager 1545 may manage communications with other base station 105, and the inter-station communications manager 1545 may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
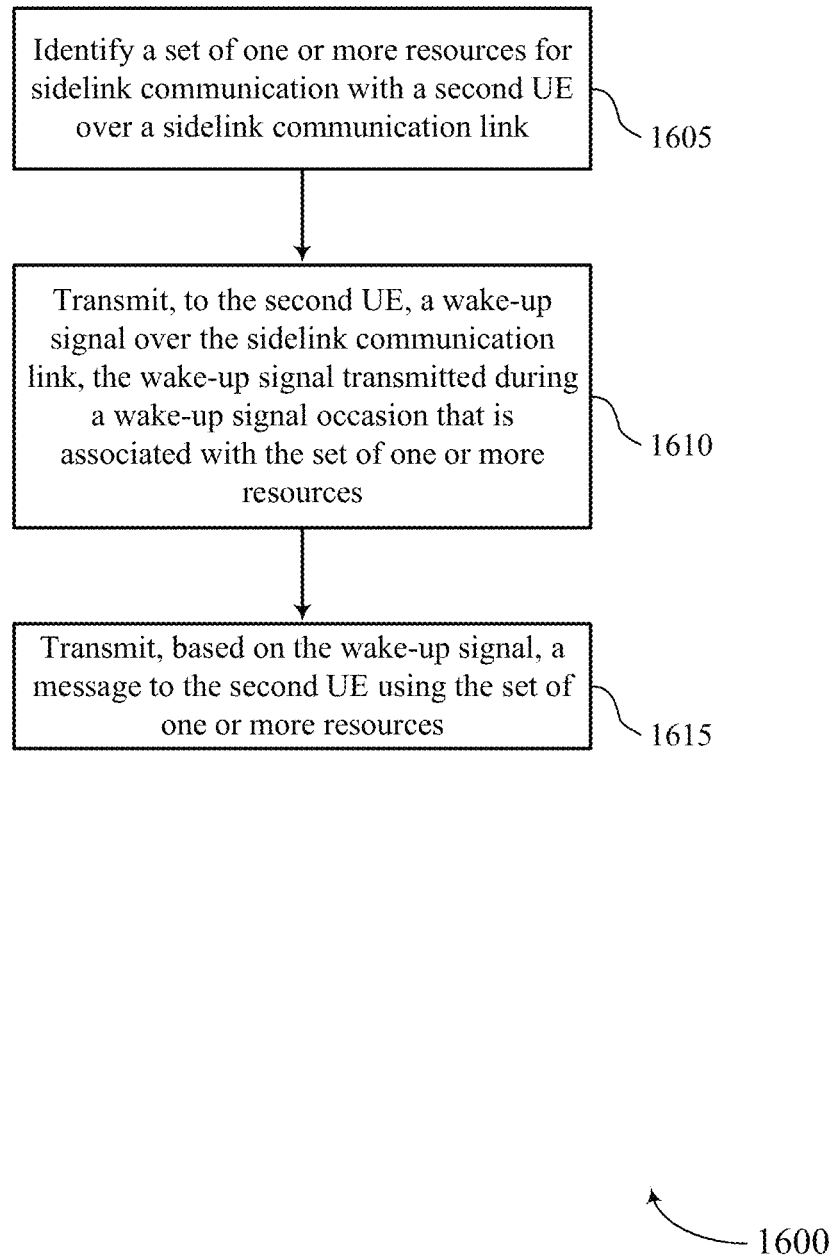
FIGS. 16 through 19 show flowcharts illustrating methods that support power saving techniques for sidelink communication in accordance with one or more aspects of the present disclosure.

FIG. 16 shows a flowchart illustrating a method 1600 that supports power saving techniques for sidelink communication in accordance with one or more aspects of the present disclosure. The operations of method 1600 may be implemented by a UE 115 (e.g., a first UE) or its components as described herein. For example, the operations of method 1600 may be performed by a UE communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the first UE may identify a set of one or more resources for sidelink communication with a second UE over a sidelink communication link. The operations of 1605 may be performed according to the methods described herein. In some examples, aspects of the operations of 1605 may be performed by a resource identification component as described with reference to FIGS. 8 through 11.

At 1610, the first UE may transmit, to the second UE, a WUS over the sidelink communication link, the WUS transmitted during a WUS occasion that is associated with the set of one or more resources. The operations of 1610 may be performed according to the methods described herein. In some examples, aspects of the operations of 1610 may be performed by a wake-up signal component as described with reference to FIGS. 8 through 11.

At 1615, the first UE may transmit, based on the WUS, a message to the second UE using the set of one or more resources. The operations of 1615 may be performed according to the methods described herein. In some examples, aspects of the operations of 1615 may be performed by a sidelink communication manager as described with reference to FIGS. 8 through 11.

Figure 17:
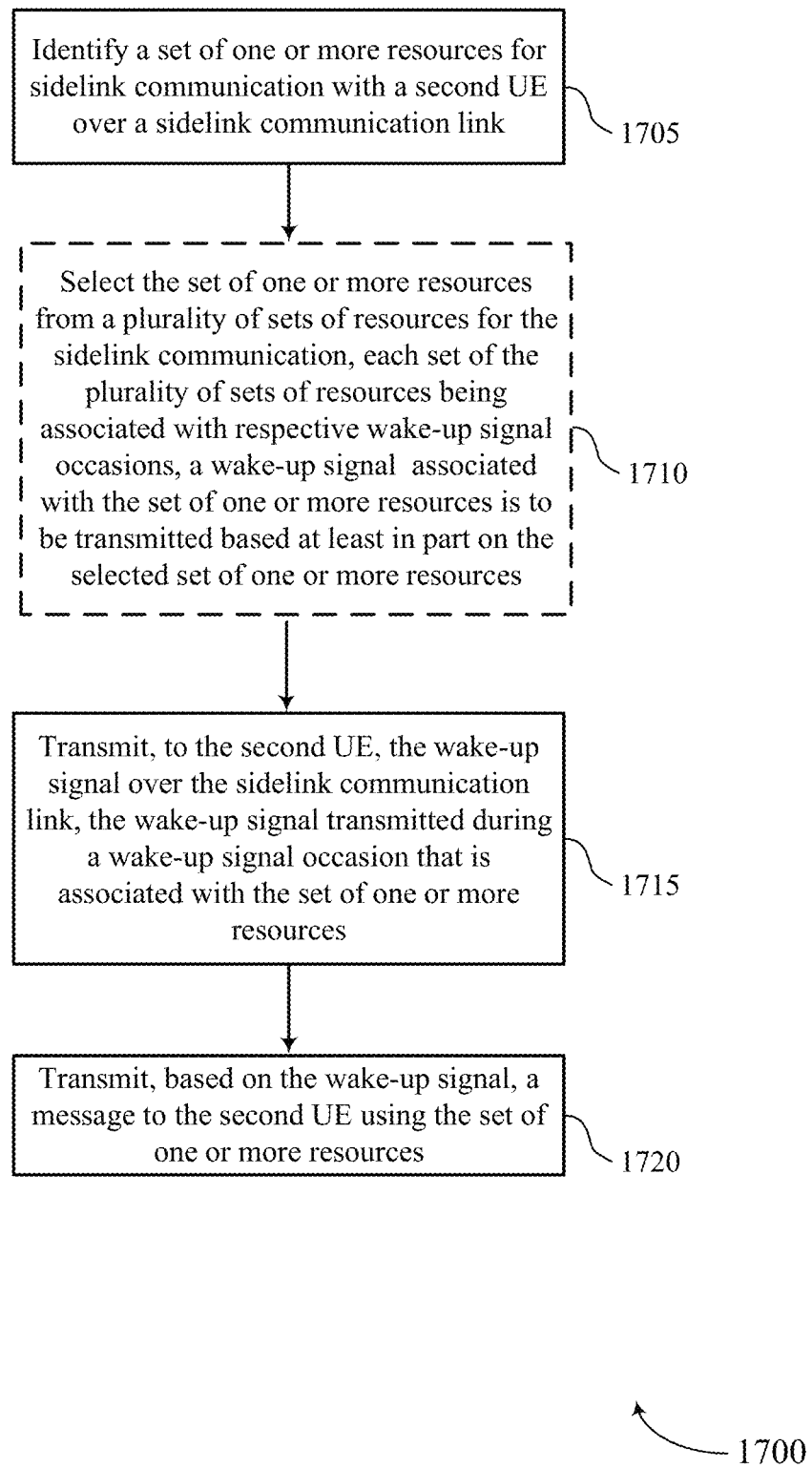

FIG. 17 shows a flowchart illustrating a method 1700 that supports power saving techniques for sidelink communication in accordance with one or more aspects of the present disclosure. The operations of method 1700 may be implemented by a UE 115 (e.g., a first UE) or its components as described herein. For example, the operations of method 1600 may be performed by a UE communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the first UE may identify a set of one or more resources for sidelink communication with a second UE over a sidelink communication link. The operations of 1705 may be performed according to the methods described herein. In some examples, aspects of the operations of 1705 may be performed by a resource identification component as described with reference to FIGS. 8 through 11.

At 1710, the first UE may select the set of one or more resources from a plurality of sets of resources for the sidelink communication, each set of the plurality of sets of resources being associated with respective WUS occasions, where a WUS associated with the set of one or more resources is to be transmitted based at least in part on the selected set of one or more resources. The operations of 1710 may be performed according to the methods described herein. In some examples, aspects of the operations of 1710 may be performed by a resource identification component as described with reference to FIGS. 8 through 11.

At 1715, the first UE may transmit, to the second UE, the WUS over the sidelink communication link, the WUS transmitted during a WUS occasion that is associated with the set of one or more resources. The operations of 1715 may be performed according to the methods described herein. In some examples, aspects of the operations of 1715 may be performed by a wake-up signal component as described with reference to FIGS. 8 through 11.

At 1720, the first UE may transmit, based on the WUS, a message to the second UE using the set of one or more resources. The operations of 1720 may be performed according to the methods described herein. In some examples, aspects of the operations of 1720 may be performed by a sidelink communication manager as described with reference to FIGS. 8 through 11.

Figure 18:
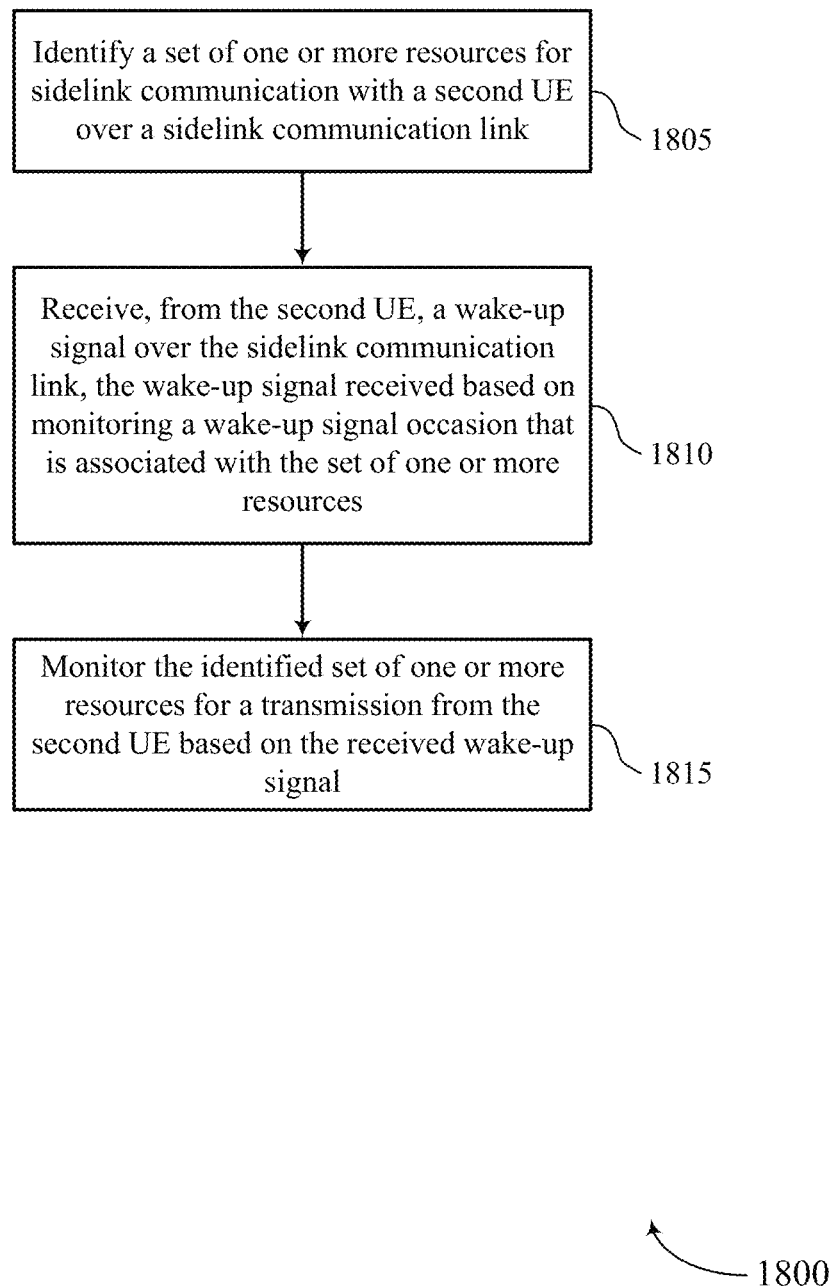

FIG. 18 shows a flowchart illustrating a method 1800 that supports power saving techniques for sidelink communication in accordance with one or more aspects of the present disclosure. The operations of method 1800 may be implemented by a UE 115 (e.g., a first UE) or its components as described herein. For example, the operations of method 1800 may be performed by a UE communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the first UE may identify a set of one or more resources for sidelink communication with a second UE over a sidelink communication link. The operations of 1805 may be performed according to the methods described herein. In some examples, aspects of the operations of 1805 may be performed by a resource identification component as described with reference to FIGS. 8 through 11.

At 1810, the first UE may receive, from the second UE, a WUS over the sidelink communication link, the WUS received based on monitoring a WUS occasion that is associated with the set of one or more resources. The operations of 1810 may be performed according to the methods described herein. In some examples, aspects of the operations of 1810 may be performed by a wake-up signal component as described with reference to FIGS. 8 through 11.

At 1815, the UE may monitor the identified set of one or more resources for a transmission from the second UE based on the received WUS. The operations of 1815 may be performed according to the methods described herein. In some examples, aspects of the operations of 1815 may be performed by a monitoring component as described with reference to FIGS. 8 through 11.

Figure 19:
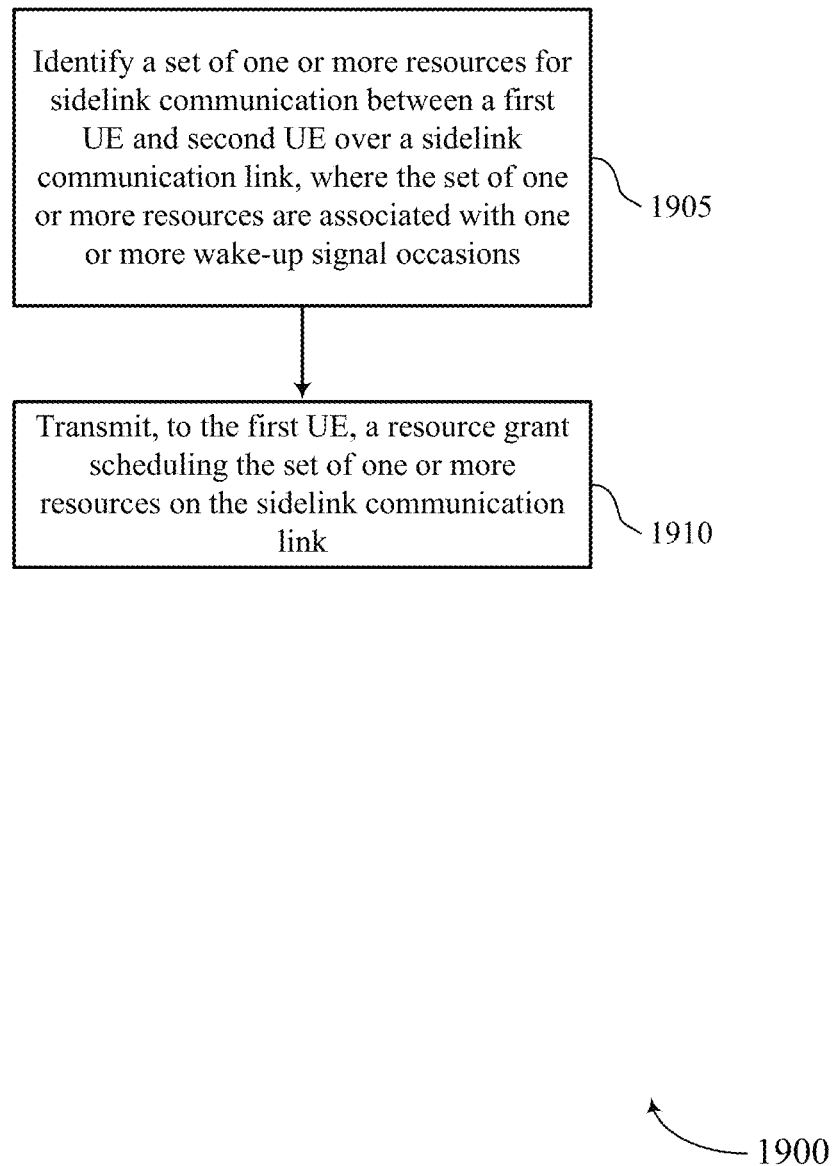

FIG. 19 shows a flowchart illustrating a method 1900 that supports power saving techniques for sidelink communication in accordance with one or more aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may identify a set of one or more resources for sidelink communication between a first UE and second UE over a sidelink communication link, where the set of one or more resources are associated with one or more WUS occasions. The operations of 1905 may be performed according to the methods described herein. In some examples, aspects of the operations of 1905 may be performed by a resource scheduling component as described with reference to FIGS. 12 through 15.

At 1910, the base station may transmit, to the first UE, a resource grant scheduling the set of one or more resources on the sidelink communication link. The operations of 1910 may be performed according to the methods described herein. In some examples, aspects of the operations of 1910 may be performed by a grant manager as described with reference to FIGS. 12 through 15.

The following provides an overview of examples of the present disclosure.

Example 1: A method for wireless communication at a first UE, comprising: identifying a set of one or more resources for sidelink communication with a second UE over a sidelink communication link; transmitting, to the second UE, a WUS over the sidelink communication link, the WUS transmitted during a WUS occasion that is associated with the set of one or more resources; and transmitting, based at least in part on the WUS, a message to the second UE using the set of one or more resources.

Example 2: The method of example 1, wherein identifying the set of one or more resources comprises: receiving, from a base station, a resource grant indicating the set of one or more resources for the sidelink communication, wherein the WUS associated with the set of one or more resources is transmitted based at least in part on the resource grant.

Example 3: The method of any of examples 1 through 2, wherein the set of one or more resources are associated with a number of multiple input multiple output (MIMO) layers.

Example 4: The method of any of examples 1 through 3, wherein identifying the set of one or more resources comprises: selecting the set of one or more resources from a plurality of sets of resources for the sidelink communication, each set of the plurality of sets of resources being associated with respective WUS occasions, wherein the WUS associated with the set of one or more resources is transmitted based at least in part on the selected set of one or more resources.

Example 5: The method of example 4, further comprising: determining a number of multiple input multiple output (MIMO) layers for communicating with the second UE over the sidelink communication link, wherein the set of one or more resources are selected based at least in part on the determined number of MIMO layers.

Example 6: The method of any of examples 1 through 5, further comprising: identifying one or more groups of slots for transmitting the message; and transmitting the message during at least one of the one or more groups of slots, wherein the WUS indicates the one or more groups of slots to the second UE.

Example 7: The method of example 6 wherein the one or more groups of slots are indicated to the second UE via a bitmap or a sequence.

Example 8: The method of any of examples 1 through 7, further comprising: transmitting the WUS in a first BWP of the sidelink communication link, wherein transmitting the message comprises transmitting the message in a second BWP that is different from the first BWP.

Example 9: The method of example 8, wherein the second BWP is from a set of BWPs associated with the sidelink communication.

Example 10: The method of any of examples 1 through 9, wherein transmitting the message comprises: transmitting the message during one or more sidelink control channel periods, each sidelink communications period comprising a physical sidelink control channel and a physical sidelink shared channel.

Example 11: The method of example 11, wherein each sidelink control channel period has a duration of a slot.

Example 12: A method for wireless communication at a first user equipment (UE), comprising: identifying a set of one or more resources for sidelink communication with a second UE over a sidelink communication link; receiving, from the second UE, a WUS over the sidelink communication link, the WUS received based at least in part on monitoring a WUS occasion that is associated with the set of one or more resources; and monitoring the identified set of one or more resources for a transmission from the second UE based at least in part on the received WUS.

Example 13: The method of example 12, wherein identifying the set of one or more resources comprises: identifying the set of one or more resources based at least in part on the received WUS.

Example 14: The method of example 13, further comprising: identifying a bitmap that indicates the set of one or more resources based at least in part on the WUS.

Example 15: The method of any of examples 12 through 14, further comprising: identifying one or more groups of slots based at least in part on an indication associated with the received WUS, wherein monitoring the identified set of one or more resources for the transmission from the second UE is performed during each of the one or more groups of slots.

Example 16: The method of example 15, further comprising: refraining from monitoring one or more groups of time periods based at least in part on the indication, the one or more groups of time periods comprising symbol periods, or slots, or a combination thereof.

Example 17: The method of any of examples 15 through 16, wherein the indication comprises a bitmap associated with the WUS.

Example 18: The method of any of examples 12 through 17, wherein the set of one or more resources are from a plurality of sets of resources for the sidelink communication, each set of the plurality of sets of resources being associated with respective WUS occasions.

Example 19: The method of any of examples 12 through 18, wherein each set of the plurality of sets of resources is associated with a respective number of multiple input multiple output (MIMO) layers.

Example 20: The method of any of examples 12 through 19, further comprising: monitoring for the WUS in a first BWP of the sidelink communication link, wherein monitoring the set of one or more resources for the transmission comprises monitoring a second BWP that is different from the first BWP.

Example 21: The method of example 21, wherein the second BWP is from a set of BWPs associated with the sidelink communication.

Example 22: The method of any of examples 12 through 21, wherein monitoring the set of one or more resources for the transmission comprises: monitoring the set of one or more resources during one or more sidelink control channel periods, each sidelink communications period comprising a physical sidelink control channel and a physical sidelink shared channel.

Example 23: The method of example 22, wherein each sidelink control channel period has a duration of a slot.

Example 24: The method of any of examples 22 through 23, wherein the physical sidelink control channel and the physical sidelink shared channel are non-overlapping in time, or non-overlapping in frequency, or overlapping in time, or overlapping in frequency, or any combination thereof.

Example 25: A method for wireless communication at a base station, comprising: identifying a set of one or more resources for sidelink communication between a first user equipment (UE) and second UE over a sidelink communication link, wherein the set of one or more resources are associated with one or more WUS occasions; and transmitting, to the first UE, a resource grant scheduling the set of one or more resources on the sidelink communication link.

Example 26: The method of example 25, wherein identifying the set of one or more resources comprises: selecting the set of one or more resources from a plurality of sets of resources for the sidelink communication, each set of the plurality of sets of resources being associated with respective WUS occasions.

Example 27: The method of example 26, wherein identifying the set of one or more resources comprises: determining a number of multiple input multiple output (MIMO) layers for the sidelink communication, wherein the set of one or more resources are selected based at least in part on the determined number of MIMO layers.

Example 28: The method of any of examples 25 through 27, wherein the set of one or more resources comprises one or more sidelink control channel periods, each sidelink communications period comprising a physical sidelink control channel and a physical sidelink shared channel.

Example 29: The method of example 28, wherein each sidelink control channel period has a duration of a slot.

Example 30: An apparatus for wireless communication comprising at least one means for performing a method of any one of the examples 1 through 11.

Example 31: An apparatus for wireless communication comprising at least one means for performing a method of any one of the examples 12 through 24.

Example 32: An apparatus for wireless communication comprising at least one means for performing a method of any one of the examples 25 through 29.

Example 33: An apparatus for wireless communication comprising a processor and memory coupled to the processor, the processor and memory configured to perform a method of any one of examples 1 through 11.

Example 34: An apparatus for wireless communication comprising a processor and memory coupled to the processor, the processor and memory configured to perform a method of any one of examples 12 through 24.

Example 35: An apparatus for wireless communication comprising a processor and memory coupled to the processor, the processor and memory configured to perform a method of any one of examples 25 through 29.

Example 36: A non-transitory computer-readable medium storing code for wireless communication, the code comprising instructions executable by a processor to perform a method of any one of examples 1 through 11.

Example 37: A non-transitory computer-readable medium storing code for wireless communication, the code comprising instructions executable by a processor to perform a method of any one of examples 12 through 24.

Example 38: A non-transitory computer-readable medium storing code for wireless communication, the code comprising instructions executable by a processor to perform a method of any one of examples 25 through 29.

It should be noted that the methods described herein describe possible implementations, and that the operations and the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   selecting one or more sidelink discontinuous reception (DRX) parameters associated with a sidelink communication link, wherein the one or more sidelink DRX parameters comprise one or more sidelink DRX timers; and
   transmitting, from the first UE, the one or more sidelink DRX parameters comprising the one or more sidelink DRX timers associated with the sidelink communication link to a second UE.

2. The method of claim 1, further comprising:
   transmitting, to the second UE, at least one transmission on the sidelink communication link based on the one or more sidelink DRX parameters.

3. The method of claim 1, wherein the first UE is within a coverage area of a cell and the second UE is outside of the coverage area of the cell.

4. The method of claim 1, wherein the one or more sidelink DRX parameters are selected from a set of sidelink DRX parameters.

5. An apparatus for wireless communication at a first user equipment (UE), comprising:
   one or more memories; and
   one or more processors, coupled to the one or more memories, configured to:
   select one or more sidelink discontinuous reception (DRX) parameters associated with a sidelink communication link, wherein the one or more sidelink DRX parameters comprise one or more sidelink DRX timers; and
   transmit, from the first UE, the one or more sidelink DRX parameters comprising the one or more sidelink DRX timers associated with the sidelink communication link to a second UE.

6. The apparatus of claim 5, wherein the one or more processors are further configured to:
   transmit, to the second UE, at least one transmission on the sidelink communication link based on the one or more sidelink DRX parameters.

7. The apparatus of claim 5, wherein the first UE is within a coverage area of a cell and the second UE is outside of the coverage area of the cell.

8. The apparatus of claim 5, wherein the one or more sidelink DRX parameters are selected from a set of sidelink DRX parameters.

9. An apparatus for wireless communication at a first user equipment (UE), comprising:
   one or more memories; and
   one or more processors, coupled to the one or more memories, configured to:
   receive, at the first UE, one or more sidelink discontinuous reception (DRX) parameters associated with a sidelink communication link from a second UE, wherein the one or more sidelink DRX parameters comprise one or more sidelink DRX timers; and
   receive, at the first UE, at least one transmission on the sidelink communication link based on the one or more sidelink DRX parameters comprising the one or more sidelink DRX timers from the second UE.

10. The apparatus of claim 9, wherein the one or more processors are further configured to:
    monitor the sidelink communication link for the at least one transmission based on the one or more sidelink DRX parameters.

11. The apparatus of claim 9, wherein the first UE is outside of a coverage area of a cell and the second UE is within the coverage area of the cell.

12. The apparatus of claim 9, wherein the one or more sidelink DRX parameters are selected by the second UE from a set of sidelink DRX parameters.

* * * * *